(12) United States Patent
    Borowicz

(10) Patent No.: US 10,814,459 B2
(45) Date of Patent: Oct. 27, 2020

(54) APPARATUS AND METHOD FOR HOLDING A WORKPIECE

(71) Applicant: The Boeing Company, Chicago, IL (US)

(72) Inventor: Clifford D. Borowicz, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 15/892,849

(22) Filed: Feb. 9, 2018

(65) Prior Publication Data

US 2019/0247983 A1    Aug. 15, 2019

(51) Int. Cl.
    *B25B 11/00*    (2006.01)
    *B25J 15/06*    (2006.01)
    *B23Q 1/03*     (2006.01)
    *B65G 47/91*    (2006.01)
    *B25J 15/00*    (2006.01)

(52) U.S. Cl.
    CPC ........... *B25B 11/005* (2013.01); *B23Q 1/035* (2013.01); *B25J 15/0052* (2013.01); *B25J 15/0616* (2013.01); *B65G 47/917* (2013.01); *Y10T 29/49998* (2015.01)

(58) Field of Classification Search
    CPC ... B65G 47/91; B25J 15/0052; B25J 15/0616; B25B 11/005
    USPC ............................................. 414/627; 294/65
    See application file for complete search history.

(56) References Cited

U.S. PATENT DOCUMENTS

| 3,166,202 | A | * | 1/1965 | Arnold | B28B 13/06 414/627 |
| 3,603,207 | A | * | 9/1971 | Parrett | F15B 15/16 91/167 R |
| 4,177,681 | A | | 12/1979 | Wess | |
| 4,527,783 | A | * | 7/1985 | Collora | B23Q 1/032 269/21 |
| 4,806,070 | A | * | 2/1989 | Poux | B65G 47/917 198/409 |
| 5,249,785 | A | | 10/1993 | Nelson et al. | |
| 5,535,853 | A | | 7/1996 | Skalski | |
| 5,590,870 | A | * | 1/1997 | Goellner | B25B 5/003 269/21 |
| 5,613,418 | A | * | 3/1997 | Guido | F15B 11/036 91/167 R |
| 5,722,646 | A | * | 3/1998 | Soderberg | B23Q 1/035 269/20 |

(Continued)

*Primary Examiner* — Jacob J Cigna
*Assistant Examiner* — Michael W Hotchkiss
(74) *Attorney, Agent, or Firm* — Walters & Wasylyna LLC

(57) ABSTRACT

An apparatus for holding a workpiece includes a fixture base, a linear actuator coupled to the fixture base and having an outboard end that is linearly movable by the linear actuator, and a vacuum gripper located at the outboard end of the linear actuator. The linear actuator is configured to linearly move the vacuum gripper relative to the fixture base into contact with a surface of the workpiece. With the vacuum gripper in contact with the surface of the workpiece, the vacuum gripper is configured to grip the workpiece using a vacuum formed between the vacuum gripper and the surface of the workpiece. With the vacuum formed between the vacuum gripper and the surface of the workpiece, the linear actuator is configured to lock linear movement of the vacuum gripper.

20 Claims, 20 Drawing Sheets

(56) References Cited

U.S. PATENT DOCUMENTS

| | | | | |
|---|---|---|---|---|
| 5,966,801 A * | 10/1999 | Wu | ................ | B62D 65/06 |
| | | | | 29/281.5 |
| 6,121,781 A * | 9/2000 | Martinez | ................ | B21J 15/10 |
| | | | | 324/658 |
| 6,170,157 B1 | 1/2001 | Munk et al. | | |
| 6,419,291 B1 | 7/2002 | Preta | | |
| 6,454,333 B2 * | 9/2002 | Portal | ................ | B23Q 1/5462 |
| | | | | 269/21 |
| 6,463,644 B1 * | 10/2002 | Pasque | ................ | B25B 11/007 |
| | | | | 269/21 |
| 6,543,117 B1 * | 4/2003 | Claycomb | ................ | B25B 11/007 |
| | | | | 29/239 |
| 6,645,131 B2 | 11/2003 | Asp et al. | | |
| 6,835,061 B1 | 12/2004 | Hehl | | |
| 7,100,955 B2 * | 9/2006 | Nakamura | ................ | B25J 15/0052 |
| | | | | 294/188 |
| 7,174,828 B2 * | 2/2007 | Davies | ................ | F15B 15/1409 |
| | | | | 92/109 |
| 7,296,834 B2 * | 11/2007 | Clark | ................ | B25J 15/0616 |
| | | | | 294/65 |
| 7,416,176 B2 * | 8/2008 | Hamann | ................ | B25B 11/005 |
| | | | | 269/21 |
| 7,444,742 B2 * | 11/2008 | Sturm, Jr. | ................ | B23Q 1/035 |
| | | | | 29/712 |
| 7,831,352 B2 | 11/2010 | Laumer et al. | | |
| 7,918,440 B2 * | 4/2011 | Schiavi | ................ | B25B 11/005 |
| | | | | 269/20 |
| 8,079,578 B2 * | 12/2011 | Bumgarner | ................ | B25B 11/005 |
| | | | | 269/21 |
| 8,322,700 B2 * | 12/2012 | Saberton | ................ | B23Q 3/00 |
| | | | | 269/296 |
| 8,544,911 B2 * | 10/2013 | Chen | ................ | B25B 11/007 |
| | | | | 294/65 |
| 8,556,315 B2 | 10/2013 | Kampe | | |
| 8,960,745 B2 * | 2/2015 | Regan | ................ | B25J 15/0691 |
| | | | | 294/65 |
| 9,266,686 B2 * | 2/2016 | Schilp | ................ | B65G 49/061 |
| 9,512,864 B2 * | 12/2016 | Gamboa | ................ | B23Q 9/0042 |
| 9,553,010 B2 * | 1/2017 | Naor | ................ | H01L 21/6838 |
| 2012/0181804 A1 | 7/2012 | Schmidt et al. | | |
| 2019/0217481 A1 * | 7/2019 | Lessing | ................ | B25J 9/0027 |

\* cited by examiner

APPARATUS AND METHOD FOR HOLDING A WORKPIECE

FIELD

The present disclosure is generally related to holding fixtures and, more particularly, to apparatuses and methods for holding a workpiece during a machining operation.

BACKGROUND

In manufacturing processes, a workpiece often must undergo several machining operations, such as cutting, drilling, boring, routing, etc. It is desirable to rigidly hold the workpiece in a fixed position during the machining operation to prevent vibration, or "chatter," which can produce surface flaws in the workpiece. It is also desirable to back-up the workpiece with a support member to prevent deflection of the workpiece under a machining load, which can reduce machining accuracy. Additionally, it is desirable to perform several machining operations in the same location, for example, in a manufacturing "cell," using the same set of machining tools for different shaped workpieces.

Due to variations in the shape of different workpieces, a holding fixture that is capable of backing up and rigidly holding a workpiece in a fixed position often induces a preload into the workpiece because the workpiece deforms when it is secured to the holding fixture, which can cause flaws during assembly. A holding fixture that is capable of accommodating various shaped workpieces often lacks the capability to sufficiently hold the workpiece, which can cause flaws during machining. A holding fixture that is capable of accommodating various shaped workpieces and rigidly holding the workpiece in a fixed position typically requires manual set and adjustment of each holding fixture for each different shaped workpiece, which can be extremely time and labor intensive.

Accordingly, those skilled in the art continue with research and development efforts in the field of workpiece holding fixtures.

SUMMARY

In an example, the disclosed apparatus for holding a workpiece includes a fixture base, a linear actuator coupled to the fixture base and having an outboard end that is linearly movable by the linear actuator, and a vacuum gripper located at the outboard end of the linear actuator. The linear actuator is configured to linearly move the vacuum gripper relative to the fixture base into contact with a surface of the workpiece. With the vacuum gripper in contact with the surface of the workpiece, the vacuum gripper is configured to grip the workpiece using a vacuum formed between the vacuum gripper and the surface of the workpiece. With the vacuum formed between the vacuum gripper and the surface of the workpiece, the linear actuator is configured to lock linear movement of the vacuum gripper.

In an example, the disclosed method for holding a workpiece includes steps of: (1) linearly moving an outboard end of a linear actuator to position a vacuum gripper, located at the outboard end, in contact with a surface of the workpiece; (2) forming a vacuum between the vacuum gripper and the surface of the workpiece; (3) further linearly moving the outboard end of the linear actuator in response to the vacuum formed between the vacuum gripper and the surface of the workpiece; and (4) locking linear movement of the outboard end of the linear actuator.

Other embodiments and/or examples of the disclosed antenna and method will become apparent from the following detailed description, the accompanying drawings and the appended claims.

DETAILED DESCRIPTION

Figure 1:
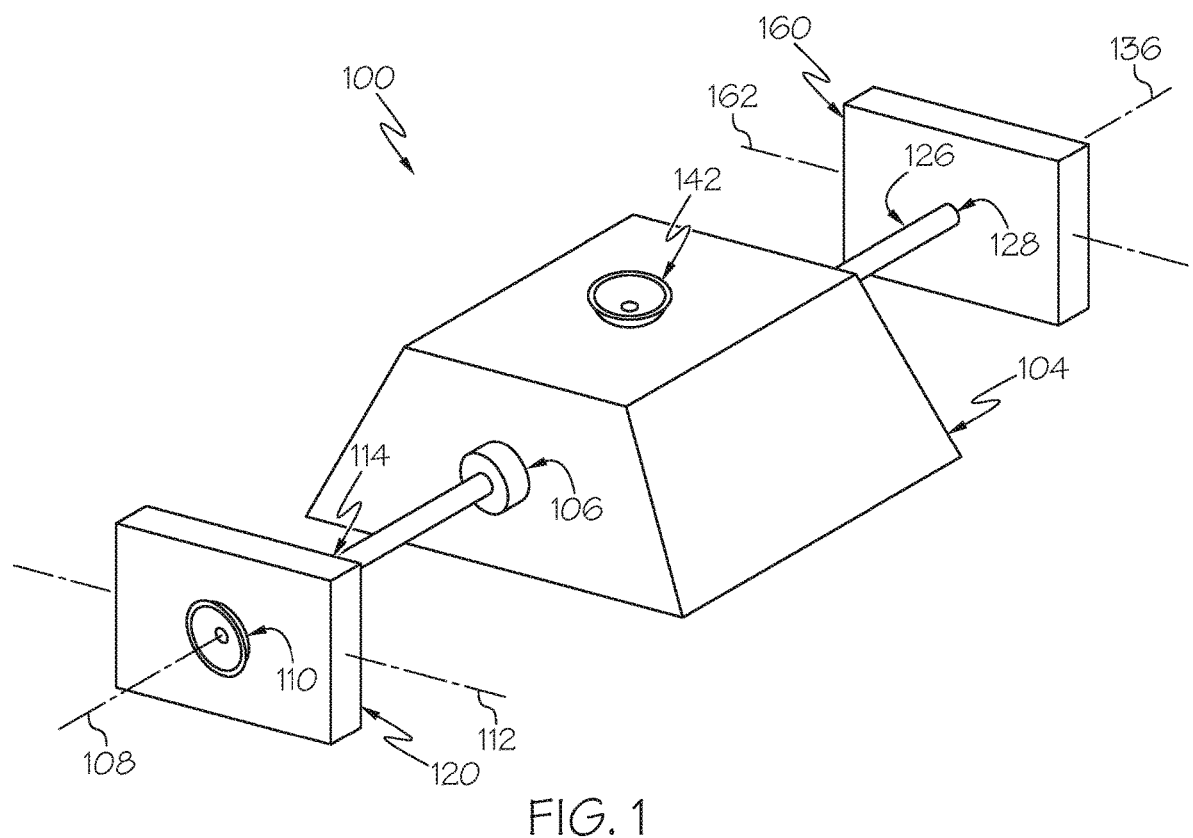
FIG. 1 is a schematic, perspective view of an example of the disclosed apparatus for holding a workpiece.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

Referring to FIGS. 1-19, disclosed is an apparatus 100 for holding a workpiece 102, for example, during a machining operation performed on the workpiece 102. Generally, the apparatus 100 operates as a holding fixture or tooling device that holds and supports the workpiece 102 while the workpiece 102 undergoes one or more machining operations. In various examples, the machining operation includes any one or more of cutting, drilling, boring, routing, reaming, milling, grinding, and the like.

In an example, the workpiece 102 is any one of various types of structures or components that is fabricated for independent use or for assembly as part of a larger structure or article. In an example, the workpiece 102 has any one of various shapes, for example, in cross-section as viewed along a longitudinal axis of the workpiece 102 and/or in cross-section as viewed along a lateral axis of the workpiece 102. In an example, the workpiece 102 includes any one of various configurations of structural members or elements, for example, which define the cross-sectional shape of the workpiece 102.

Figure 2:
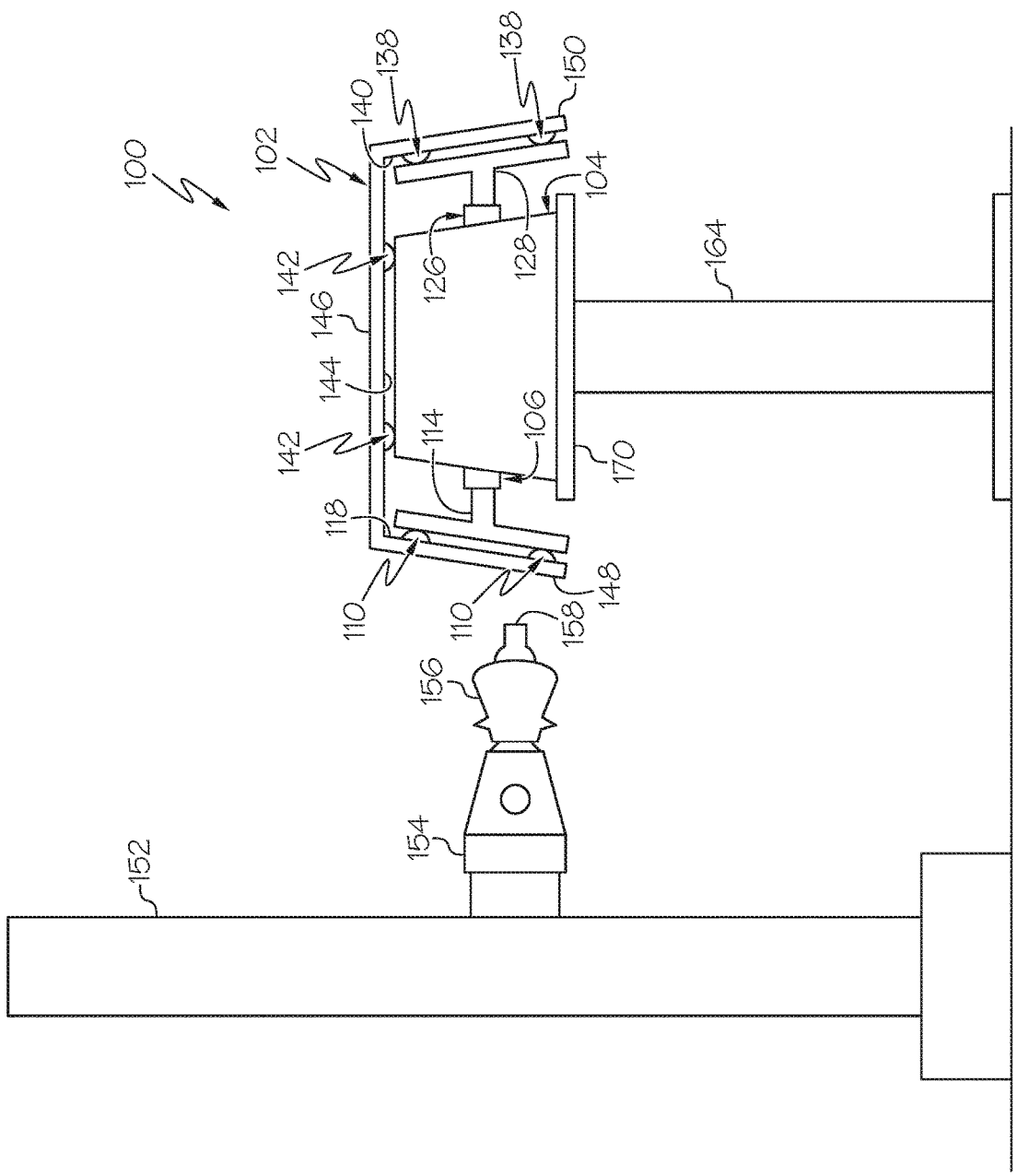
FIG. 2 is a schematic, elevation view of an example of the disclosed apparatus.
Figure 3:
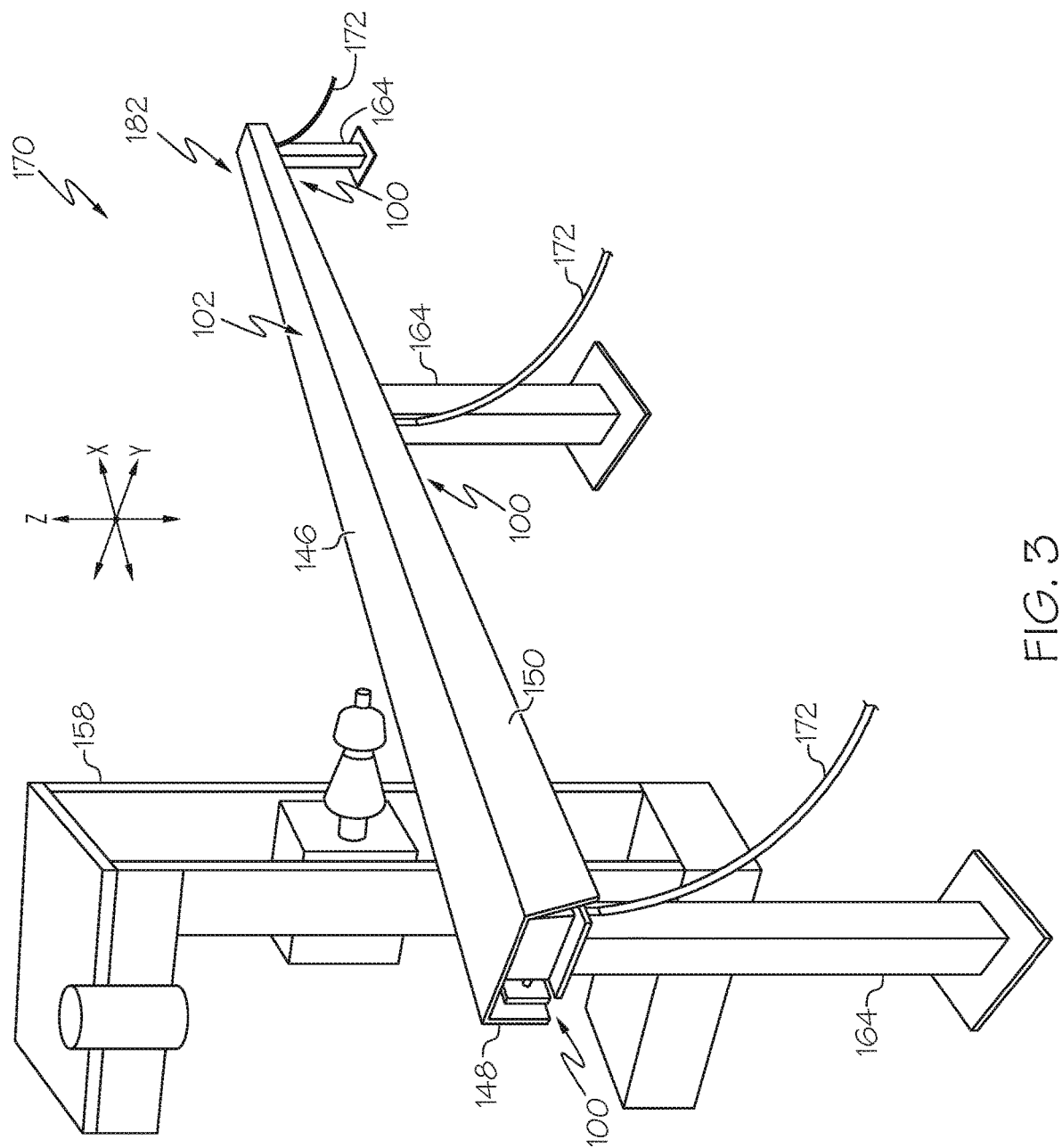
FIG. 3 is a schematic, perspective view of an example of a manufacturing environment with an array of the disclosed apparatuses holding the workpiece.

In an example, and as best illustrated in FIGS. 2 and 3, the workpiece 102 includes a web 146 and a flange 148, connected to one (e.g., a first) end of the web 146. In some examples, the workpiece 102 also includes a second flange 150, connected to the other (e.g., a second) end of the web 146 (opposite the first flange 148). In an example, the flange 148 and/or the second flange 150 is oriented at one of various angles relative to the web 146. In an example, one or both of the flange 148 and/or the second flange 150 is perpendicular to the web 146 (e.g., is oriented at a 90-degree angle relative to the web 146). In an example, one or both of the flange 148 and/or the second flange 150 is oblique to the web 146 (e.g., is oriented at a less than 90-degree angle or a greater than 90-degree angle relative to the web 146). In an example, an orientation angle of the flange 148 and the second flange 150 relative to the web 146 is the same. In an example, the orientation angle of the flange 148 and the second flange 150 relative to the web 146 is different.

Referring to FIGS. 1 and 2, in an example, the apparatus 100 includes a fixture base 104 and a linear actuator 106 coupled to the fixture base 104. The linear actuator 106 includes an outboard end 114 that is linearly movable by the linear actuator 106 relative to the fixture base 104 along a movement axis 108 (FIG. 1). The apparatus 100 also includes a vacuum gripper 110 located at the outboard end 114 of the linear actuator 106. The linear actuator 106 is configured to linearly move the vacuum gripper 110 relative to the fixture base 104 along the movement axis 108 into contact with a surface 118 (FIG. 2) of the workpiece 102. With the vacuum gripper 110 in contact with the surface 118 of the workpiece 102, the vacuum gripper 110 is configured to grip the workpiece 102 using a vacuum formed between the vacuum gripper 110 and the surface 118 of the workpiece 102. With the vacuum formed between the vacuum gripper 110 and the surface 118 of the workpiece 102, the linear actuator 106 is configured to lock linear movement of, and lock a linear position of, the vacuum gripper 110 along the movement axis 108. As used herein, "lock" and "locking," for example, in reference to movement and/or position, refers to immobilizing or making the element to which the term refers immovable.

Gripping the workpiece 102 with the vacuum gripper 110 holds the workpiece 102 in a rigidly fixed position and prevents, or greatly reduces, vibration in the workpiece 102 during the machining operation. With linear movement of the outboard end 114 and the vacuum gripper 110 locked by the linear actuator 106, the outboard end 114 of the linear actuator 106 supports the workpiece 102 from behind, opposing a machining load applied to the workpiece 102, during the machining operation. Supporting the workpiece 102 from behind, with the outboard end 114 of the linear actuator 106, backs-up at least the portion of the workpiece 102 undergoing the machining operation and prevents, or greatly reduces, deflection of the workpiece 102 under the machining load.

As illustrated in FIG. 2, upon activation, the vacuum gripper 110 provides a sufficient holding force such that the workpiece 102 is firmly held against and is supported by the outboard end 114 of the linear actuator 106. Once the workpiece 102 is accurately positioned and secured to the apparatus 100 relative to a manufacturing tool 152, a robotic arm 154 and an end effector 156, utilizing a preselected machining tool 158, can perform the desired machining operation. In an example, the manufacturing tool 152 is a computer-controlled manufacturing tool that receives commands from a computer controller.

Referring to FIGS. 2 and 3, in an example, the apparatus 100 also includes a support 164. The support 164 provides a mounting location for the fixture base 104. In an example, the fixture base 104 is fastened or otherwise rigidly connected to the support 164, for example, to a support platform of the support 164. In an example, the support 164 indexes the apparatus 100 and the workpiece 102 relative to the manufacturing tool 152. Indexing the workpiece 102 ensures that the workpiece 102 is accurately positioned on the apparatus 100 relative to the manufacturing tool 152.

In some examples, the support 164 enables vertical movement of the apparatus 100 (e.g., along a Z-axis) relative to the manufacturing tool 152. In some examples, the support 164 enables horizontal movement of the apparatus 100 (e.g., along an X-axis and/or a Y-axis (FIG. 3)) relative to the manufacturing tool 152. In some examples, the support 164 enables rotational movement of the apparatus 100 (e.g., about the X-axis, the Y-axis and/or the Z-axis) relative to the manufacturing tool 152. In some examples, one or more of the horizontal movement, the vertical movement and/or the rotational movement of the apparatus 100 by the support 164 is selectively controlled. In an example, the support 164 includes one or more translation assemblies and/or rotation assemblies that are computer controlled and that receive commands from the computer controller. In an example, the computer controller coordinates movement of the apparatus 100 (and the workpiece 102 coupled to the apparatus 100) and movement of the manufacturing tool 152.

Referring to FIG. 3, an example of a manufacturing environment 170 includes a plurality (e.g., an array 182) of apparatuses 100, each one of the apparatuses 100 being mounted to an indexing support 164 and spaced apart from another one of the apparatuses 100 along a length of the workpiece 102 (only one apparatus 100 of the array 182 is visible in FIG. 3). In the illustrative example, the array 182 includes three apparatuses 100 used to hold and support the workpiece 102. However, in other examples, the number of apparatuses 100 varies and depends, for example, on the length of the workpiece 102, the shape of the workpiece 102, the type of machining operation being performed on the workpiece 102, and the like.

Referring again to FIGS. 1 and 2, in an example, the apparatus 100 also includes a second linear actuator 126 coupled to the fixture base 104. The second linear actuator 126 includes a second outboard end 128 that is linearly movable by the second linear actuator 126 relative to the fixture base 104 along a second movement axis 136 (FIG. 1). The apparatus 100 also includes a second vacuum gripper 138 located at the second outboard end 128 of the second linear actuator 126. The second linear actuator 126 is configured to linearly move the second vacuum gripper 138 relative to the fixture base 104 along the second movement axis 136 into contact with a second surface 140 of the workpiece 102. With the second vacuum gripper 138 in contact with the second surface 140 of the workpiece 102, the second vacuum gripper 138 is configured to grip the workpiece 102 using a second vacuum formed between the second vacuum gripper 138 and the second surface 140 of the workpiece 102. With the second vacuum formed between the second vacuum gripper 138 and the second surface 140 of the workpiece 102, the second linear actuator 126 is configured to lock linear movement of the second vacuum gripper 138 along the second movement axis 136.

Gripping the workpiece 102 with the second vacuum gripper 138 holds the workpiece 102 in a rigidly fixed position and prevents, or greatly reduces, vibration in the workpiece 102 during the machining operation. With linear movement of the second outboard end 128 and the second vacuum gripper 138 locked by the second linear actuator 126, the second outboard end 128 of the second linear actuator 126 supports the workpiece 102 from behind, opposing a machining load applied to the workpiece 102, during the machining operation. Supporting the workpiece 102 from behind, with the second outboard end 128 of the second linear actuator 126, backs-up at least the portion of the workpiece 102 undergoing the machining operation and prevents, or greatly reduces, deflection of the workpiece 102 under the machining load.

As illustrated in FIG. 2, upon activation, the second vacuum gripper 138 provides a sufficient holding force such that the workpiece 102 is firmly held against and is supported by the second outboard end 128 of the second linear actuator 126. Once the workpiece 102 is accurately positioned and secured to the apparatus 100 relative to the manufacturing tool 152, the robotic arm 154 and the end effector 156, utilizing the preselected machining tool 158, can perform the desired machining operation.

In the illustrative example, the vacuum gripper 110 grips the flange 148 of the workpiece 102 and rigidly holds the flange 148. The outboard end 114 of the linear actuator 106 backs-up the flange 148 and prevents deflection of the flange 148 in response to the machining load. The second vacuum gripper 138 grips the second flange 150 of the workpiece 102 and rigidly holds the second flange 150. The second outboard end 128 of the second linear actuator 126 backs-up the second flange 150 and prevents deflection of the second flange 150 in response to the machining load.

In an example, the second movement axis 136 is coincident with the movement axis 108. The movement axis 108 and the second movement axis 136 being coincident axially aligns the linear actuator 106 and the second linear actuator 126 and enables the outboard end 114 of the linear actuator 106 and the second outboard end 128 of the second linear actuator 126 to support the workpiece 102 in axially opposite locations relative to one another.

In an example, the second movement axis 136 is parallel to the movement axis 108. The movement axis 108 and the second movement axis 136 being parallel axially offsets the linear actuator 106 and the second linear actuator 126 and enables the outboard end 114 of the linear actuator 106 and the second outboard end 128 of the second linear actuator 126 to support the workpiece 102 in axially-offset opposite locations relative to one another.

Referring still to FIGS. 1 and 2, in an example, the apparatus 100 also includes a third vacuum gripper 142 located on the fixture base 104. With the third vacuum gripper 142 in contact with a third surface 144 (FIG. 2) of the workpiece 102, the third vacuum gripper 142 is configured to grip the workpiece 102 using a third vacuum formed between the third vacuum gripper 142 and the third surface 144 of the workpiece 102.

Gripping the workpiece 102 with the third vacuum gripper 142 holds the workpiece 102 in a rigidly fixed position and prevents, or greatly reduces, vibration in the workpiece 102 during the machining operation. Because the third vacuum gripper 142 is located on the fixture base 104, the fixture base 104 supports the workpiece 102 from behind, opposing a machining load applied to the workpiece 102, during the machining operation. Supporting the workpiece 102 from behind, with the fixture base 104, backs-up at least the portion of the workpiece 102 undergoing the machining operation and prevents, or greatly reduces, deflection of the workpiece 102 under the machining load.

As illustrated in FIG. 2, upon activation, the third vacuum gripper 142 provides a sufficient holding force such that the workpiece 102 is firmly held against and is supported by the fixture base 104. Once the workpiece 102 is accurately positioned and secured to the apparatus 100 relative to the manufacturing tool 152, the robotic arm 154 and the end effector 156, utilizing the preselected machining tool 158, can perform the desired machining operation.

In the illustrative example, the vacuum gripper 110 grips the flange 148 of the workpiece 102 and rigidly holds the flange 148. The outboard end 114 of the linear actuator 106 backs-up the flange 148 and prevents deflection of the flange 148 in response to the machining load. The second vacuum gripper 138 grips the second flange 150 of the workpiece 102 and rigidly holds the second flange 150. The second outboard end 128 of the second linear actuator 126 backs-up the second flange 150 and prevents deflection of the second flange 150 in response to the machining load. The third vacuum gripper 142 grips the web 146 of the workpiece 102 and rigidly holds the web 146. The fixture base 104 backs-up the web 146 and prevents deflection of the web 146 in response to the machining load.

Figure 4:
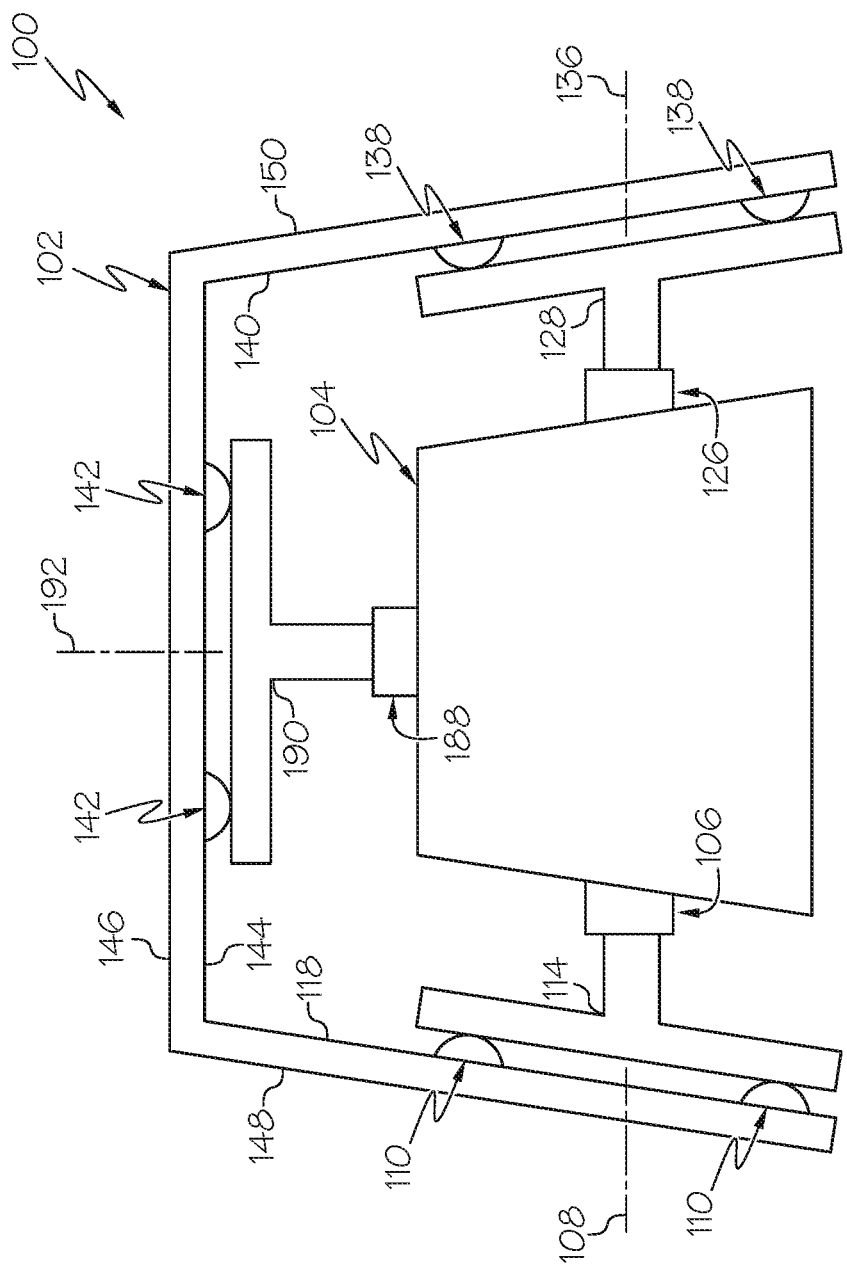
FIG. 4 is a schematic, elevation view of an example of the disclosed apparatus.

Referring to FIG. 4, in an example, the apparatus 100 also includes a third linear actuator 188 coupled to the fixture base 104. The third linear actuator 188 includes a third outboard end 190 that is linearly movable by the third linear actuator 188 relative to the fixture base 104 along a third movement axis 192. The third vacuum gripper 142 is located at the third outboard end 190 of the third linear actuator 188. The third linear actuator 188 is configured to linearly move the third vacuum gripper 142 relative to the fixture base 104 along the third movement axis 192 into contact with the third surface 194 of the workpiece 102. With the third vacuum gripper 142 in contact with the third surface 194 of the workpiece 102, the third vacuum gripper 142 is configured to grip the workpiece 102 using the third vacuum formed between the third vacuum gripper 142 and the third surface 194 of the workpiece 102. With the third vacuum formed between the third vacuum gripper 142 and the third surface 194 of the workpiece 102, the third linear actuator 188 is configured to lock linear movement of the third vacuum gripper 142 along the third movement axis 192.

Gripping the workpiece 102 with the third vacuum gripper 142 holds the workpiece 102 in a rigidly fixed position and prevents, or greatly reduces, vibration in the workpiece 102 during the machining operation. With linear movement of the third outboard end 190 and the third vacuum gripper 142 locked by the third linear actuator 188, the third outboard end 190 of the third linear actuator 188 supports the workpiece 102 from behind, opposing a machining load applied to the workpiece 102, during the machining operation. Supporting the workpiece 102 from behind, with the third outboard end 190 of the third linear actuator 188, backs-up at least the portion of the workpiece 102 undergoing the machining operation and prevents, or greatly reduces, deflection of the workpiece 102 under the machining load.

As illustrated in FIG. 4, upon activation, the third vacuum gripper 142 provides a sufficient holding force such that the workpiece 102 is firmly held against and is supported by the third outboard end 190 of the second linear actuator 126. Once the workpiece 102 is accurately positioned and secured to the apparatus 100 relative to the manufacturing tool 152, the robotic arm 154 and the end effector 156, utilizing the preselected machining tool 158, can perform the desired machining operation.

In the illustrative example, the vacuum gripper 110 grips the flange 148 of the workpiece 102 and rigidly holds the flange 148. The outboard end 114 of the linear actuator 106 backs-up the flange 148 and prevents deflection of the flange 148 in response to the machining load. The second vacuum gripper 138 grips the second flange 150 of the workpiece 102 and rigidly holds the second flange 150. The second outboard end 128 of the second linear actuator 126 backs-up the second flange 150 and prevents deflection of the second flange 150 in response to the machining load. The third vacuum gripper 142 grips the web 146 of the workpiece 102 and rigidly holds the web 146. The third outboard end 190 of the third linear actuator 188 backs-up the web 146 and prevents deflection of the web 146 in response to the machining load.

In an example, the third movement axis 192 is perpendicular to the movement axis 108 and/or the second movement axis 136. The third movement axis 192 being perpendicular to at least one of the movement axis 108 and/or the second movement axis 136 enables the third outboard end 190 of the third linear actuator 188 to support the workpiece in a non-axial location relative to the outboard end 114 of the linear actuator 106 and the second outboard end 128 of the second linear actuator 126.

Figure 5:
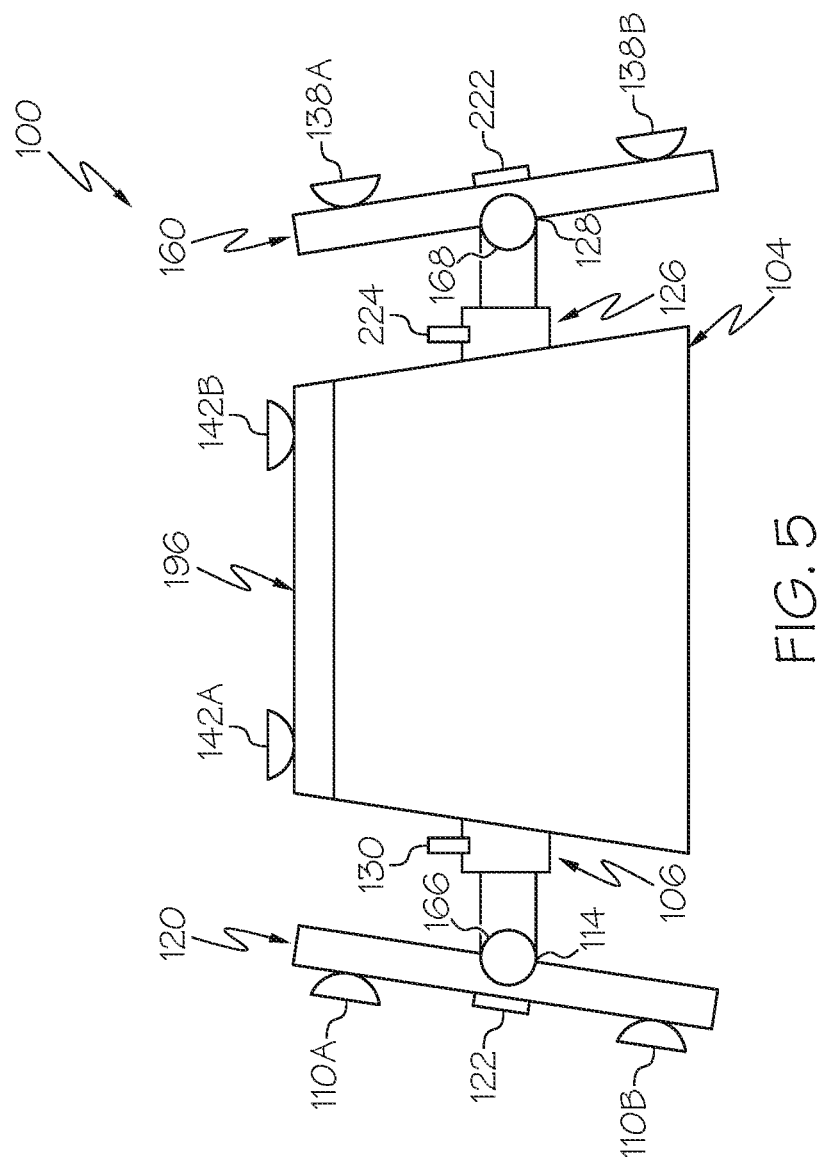
FIG. 5 is a schematic, elevation view of an example of the disclosed apparatus.
Figure 6:
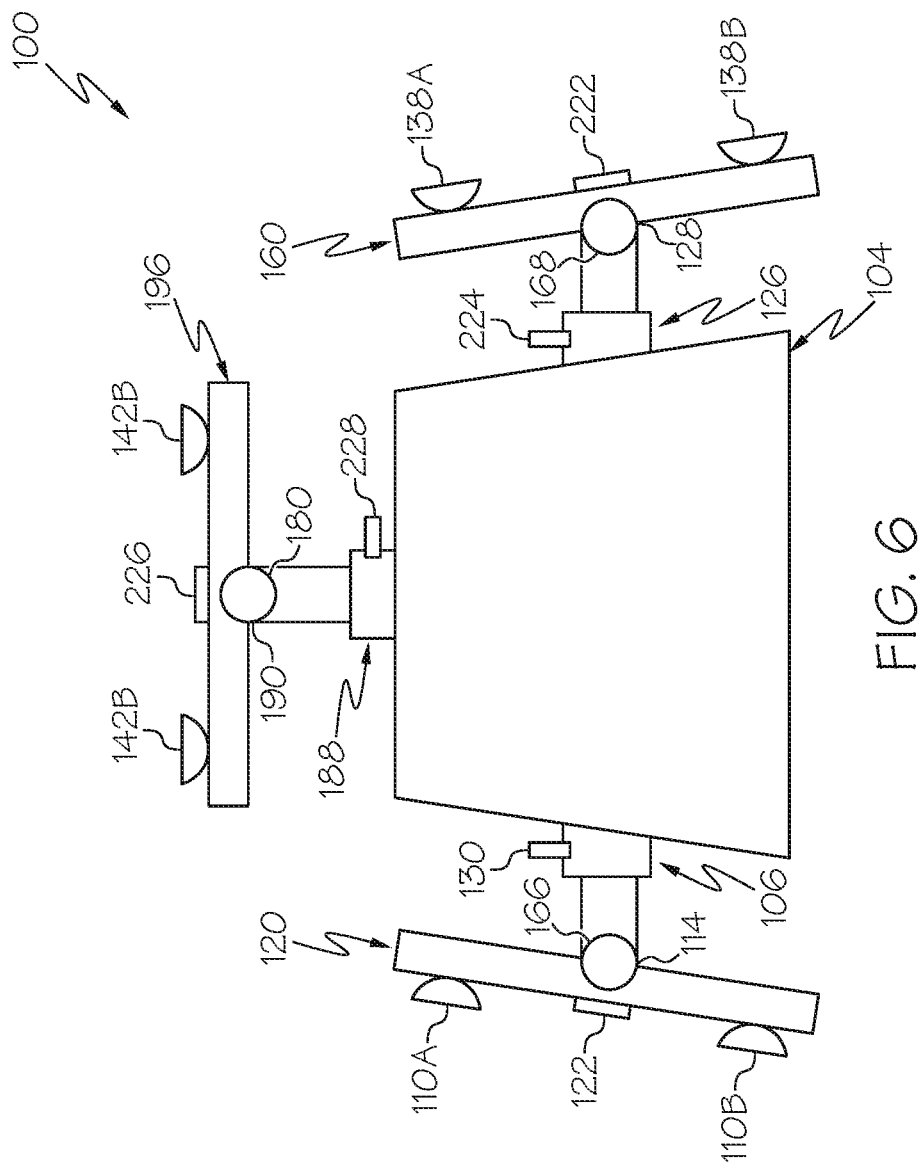
FIG. 6 is a schematic, elevation view of an example of the disclosed apparatus.

Referring to FIGS. 5 and 6, in an example, the apparatus 100 includes more than one vacuum gripper 110, for example, vacuum gripper 110A, vacuum gripper 110B, etc. (also referred to individually or collectively as vacuum gripper(s) 110). One or more of the vacuum grippers 110 may be aligned with, offset from, or positioned in any configuration relative to one or more others of the vacuum grippers 110.

In an example, the apparatus 100 includes more than one second vacuum gripper 138, for example, second vacuum gripper 138A, second vacuum gripper 138B, etc. (also referred to individually or collectively as second vacuum gripper(s) 138). One or more of the second vacuum grippers 138 may be aligned with, offset from, or positioned in any configuration relative to one or more others of the second vacuum grippers 138.

In an example, the apparatus 100 includes more than one third vacuum gripper 142, for example, third vacuum gripper 142A, third vacuum gripper 142B, etc. (also referred to individually or collectively as third vacuum gripper(s) 142). One or more of the third vacuum grippers 142 may be aligned with, offset from, or positioned in any configuration relative to one or more others of the third vacuum grippers 142.

In an example, the apparatus 100 includes a vacuum foot 120 coupled to the outboard end 114 of the linear actuator 106. The vacuum foot 120 enables use of a plurality of the vacuum grippers 110. Each one of the vacuum grippers 110 is coupled to the vacuum foot 120. The linear actuator 106 is configured to linearly move the vacuum foot 120 relative to the fixture base 104 along the movement axis 108 into contact with the surface 118 of the workpiece 102 (FIG. 4).

With the vacuum formed between the vacuum grippers 110 and the surface 118 of the workpiece 102, the linear actuator 106 is configured to lock linear movement of the vacuum foot 120 along the movement axis 108. The vacuum foot 120 increases a contact footprint between the apparatus 100 and the workpiece 102 and backs-up a larger surface area of the workpiece 102. With linear movement of the outboard end 114 and the vacuum grippers 110 locked by the linear actuator 106, the vacuum foot 120 supports the workpiece 102 from behind, opposing the machining load applied to the workpiece 102, during the machining operation. Supporting the workpiece 102 from behind, with the vacuum foot 120, backs-up a larger portion of the workpiece 102 undergoing the machining operation and prevents, or greatly reduces, deflection of the workpiece 102 under the machining load.

In an example, the apparatus 100 also includes a pivot coupling 166 that pivotally couples the linear actuator 106 and the vacuum foot 120. The pivot coupling 166 enables the vacuum foot 120 to pivot relative to the linear actuator 106 about at least one pivot axis 112 (FIG. 1). In an example, the movement axis 108 (FIG. 1) extends through the pivot coupling 166. In an example, the pivot axis 112 is perpendicular to the movement axis 108. The vacuum foot 120 being pivotable relative to the linear actuator 106 enables self-adjustment of an angular orientation of the vacuum foot 120 relative to the workpiece 102 to accommodate for different shapes of the workpiece 102.

In an example, the pivot coupling 166 includes a first pivot member that is coupled to the linear actuator 106 at the outboard end 114 and a second pivot member that is coupled to the vacuum foot 120. In an example, the first pivot member is at least partially spherical and the second pivot member includes rounded walls that correspond to the surface profile of the first pivot member such that the first pivot member is received by the second pivot member and is rotatable therein. In this example, the first pivot member and the second pivot member cooperate to define a ball-and-socket joint such that the pivot coupling 166 enables the vacuum foot 120 to pivot relative to the linear actuator 106 about a plurality of different pivot axes 112, each of which having a common center point.

In an example, the apparatus 100 also includes a second vacuum foot 160 coupled to second outboard end 128 of the second linear actuator 126. The second vacuum foot 160 enables use of a plurality of the second vacuum grippers 138. Each one of the second vacuum grippers 138 is coupled to the second vacuum foot 160. The second linear actuator 126 is configured to linearly move the second vacuum foot 160 relative to the fixture base 104 along the second movement axis 136 into contact with the second surface 140 of the workpiece 102 (FIG. 4).

With the second vacuum formed between the second vacuum grippers 138 and the second surface 140 of the workpiece 102, the second linear actuator 126 is configured to lock linear movement of the second vacuum foot 160 along the second movement axis 136. The second vacuum foot 160 increases a contact footprint between the apparatus 100 and the workpiece 102 and backs-up a larger surface area of the workpiece 102. With linear movement of the second outboard end 128 and the second vacuum grippers 138 locked by the second linear actuator 126, the second vacuum foot 160 supports the workpiece 102 from behind, opposing the machining load applied to the workpiece 102, during the machining operation. Supporting the workpiece 102 from behind, with the second vacuum foot 160, backs-up a larger portion of the workpiece 102 undergoing the machining operation and prevents, or greatly reduces, deflection of the workpiece 102 under the machining load.

In an example, the apparatus 100 also includes a second pivot coupling 168 that pivotally couples the second linear actuator 126 and the second vacuum foot 160. The second pivot coupling 168 enables the second vacuum foot 160 to pivot relative to the second linear actuator 126 about at least one second pivot axis 162 (FIG. 1). In an example, the second movement axis 136 (FIG. 1) extends through the second pivot coupling 168. In an example, the second pivot axis 162 is perpendicular to the second movement axis 136. The second vacuum foot 160 being pivotable relative to the second linear actuator 126 enables self-adjustment of an angular orientation of the second vacuum foot 160 relative to the workpiece 102 to accommodate for different shapes of the workpiece 102.

In an example, the second pivot coupling 168 includes a first pivot member that is coupled to the second linear actuator 126 at the second outboard end 128 and a second pivot member that is coupled to the second vacuum foot 160. In an example, the first pivot member is at least partially spherical and the second pivot member includes rounded walls that correspond to the surface profile of the first pivot member such that the first pivot member is received by the second pivot member and is rotatable therein. In this example, the first pivot member and the second pivot member cooperate to define a ball-and-socket joint such that the second pivot coupling 168 enables the second vacuum foot 160 to pivot relative to the second linear actuator 126 about a plurality of different second pivot axes 162, each of which having a common center point.

In an example, the apparatus 100 also includes a third vacuum foot 196. The third vacuum foot 196 enables use of a plurality of the third vacuum grippers 142. Each one of the third vacuum grippers 142 is coupled to the third vacuum foot 196.

In an example, and as illustrated in FIG. 5, the apparatus 100 the third vacuum foot 196 is coupled to fixture base 104. In this example, the fixture base 104 fixes the linear position and an angular orientation of the third vacuum foot 196 relative to the workpiece 102.

In an example, and as illustrated in FIG. 6, the third vacuum foot 196 is coupled to the third outboard end 190 of the third linear actuator 188. The third linear actuator 188 is configured to linearly move the third vacuum foot 196 relative to the fixture base 104 along the third movement axis 192 into contact with the third surface 194 of the workpiece 102 (FIG. 4).

With the third vacuum formed between the third vacuum grippers 142 and the third surface 194 of the workpiece 102, the third linear actuator 188 is configured to lock linear movement of the third vacuum foot 196 along the third movement axis 192. The third vacuum foot 196 increases a contact footprint between the apparatus 100 and the workpiece 102 and backs-up a larger surface area of the workpiece 102. With linear movement of the third outboard end 190 and the third vacuum grippers 142 locked by the third linear actuator 188, the third vacuum foot 196 supports the workpiece 102 from behind, opposing the machining load applied to the workpiece 102, during the machining operation. Supporting the workpiece 102 from behind, with the third vacuum foot 196, backs-up a larger portion of the workpiece 102 undergoing the machining operation and prevents, or greatly reduces, deflection of the workpiece 102 under the machining load.

In an example, the apparatus 100 also includes a third pivot coupling 180 that pivotally couples the third linear actuator 188 and the third vacuum foot 196. The third pivot coupling 180 enables the third vacuum foot 196 to pivot relative to the third linear actuator 188 about at least one third pivot axis (not shown). In an example, the third movement axis 192 (FIG. 3) extends through the third pivot coupling 180. In an example, the third pivot axis is perpendicular to the third movement axis 192. The third vacuum foot 196 being pivotable relative to the third linear actuator 188 enables self-adjustment of an angular orientation of the third vacuum foot 196 relative to the workpiece 102 to accommodate for different shapes of the workpiece 102.

In an example, the third pivot coupling 180 includes a first pivot member that is coupled to the third linear actuator 188 at the third outboard end 190 and a second pivot member that is coupled to the third vacuum foot 196. In an example, the first pivot member is at least partially spherical and the second pivot member includes rounded walls that correspond to the surface profile of the first pivot member such that the first pivot member is received by the second pivot member and is rotatable therein. In this example, the first pivot member and the second pivot member cooperate to define a ball-and-socket joint such that the third pivot coupling 180 enables the third vacuum foot 196 to pivot relative to the third linear actuator 188 about a plurality of different third pivot axes, each of which having a common center point.

In some examples, the vacuum foot 120, the second vacuum foot 160, and/or the third vacuum foot 196 has any one of various different two-dimensional shapes, viewed along the movement axis associated therewith. In the illustrative examples, the vacuum foot 120, the second vacuum foot 160, and/or the third vacuum foot 196 has a rectangular shape, viewed along the movement axis associated therewith.

In some examples, the vacuum foot 120, the second vacuum foot 160, and/or the third vacuum foot 196 has any one of various different profile shapes, viewed along an axis perpendicular to the movement axis associated therewith. In the illustrative examples, the vacuum foot 120, the second vacuum foot 160, and/or the third vacuum foot 196 has a flat profile shape, viewed along an axis perpendicular to the movement axis associated therewith. The flat profile shape is suitable for engaging and backing up a flat surface of the workpiece 102. In other examples, the vacuum foot 120, the second vacuum foot 160, and/or the third vacuum foot 196 has a curved profile shape along one or more lateral dimensions, viewed along an axis perpendicular to the movement axis associated therewith. The curved profile shape is suitable for engaging and backing up a curved or contoured surface of the workpiece 102.

Figure 7:
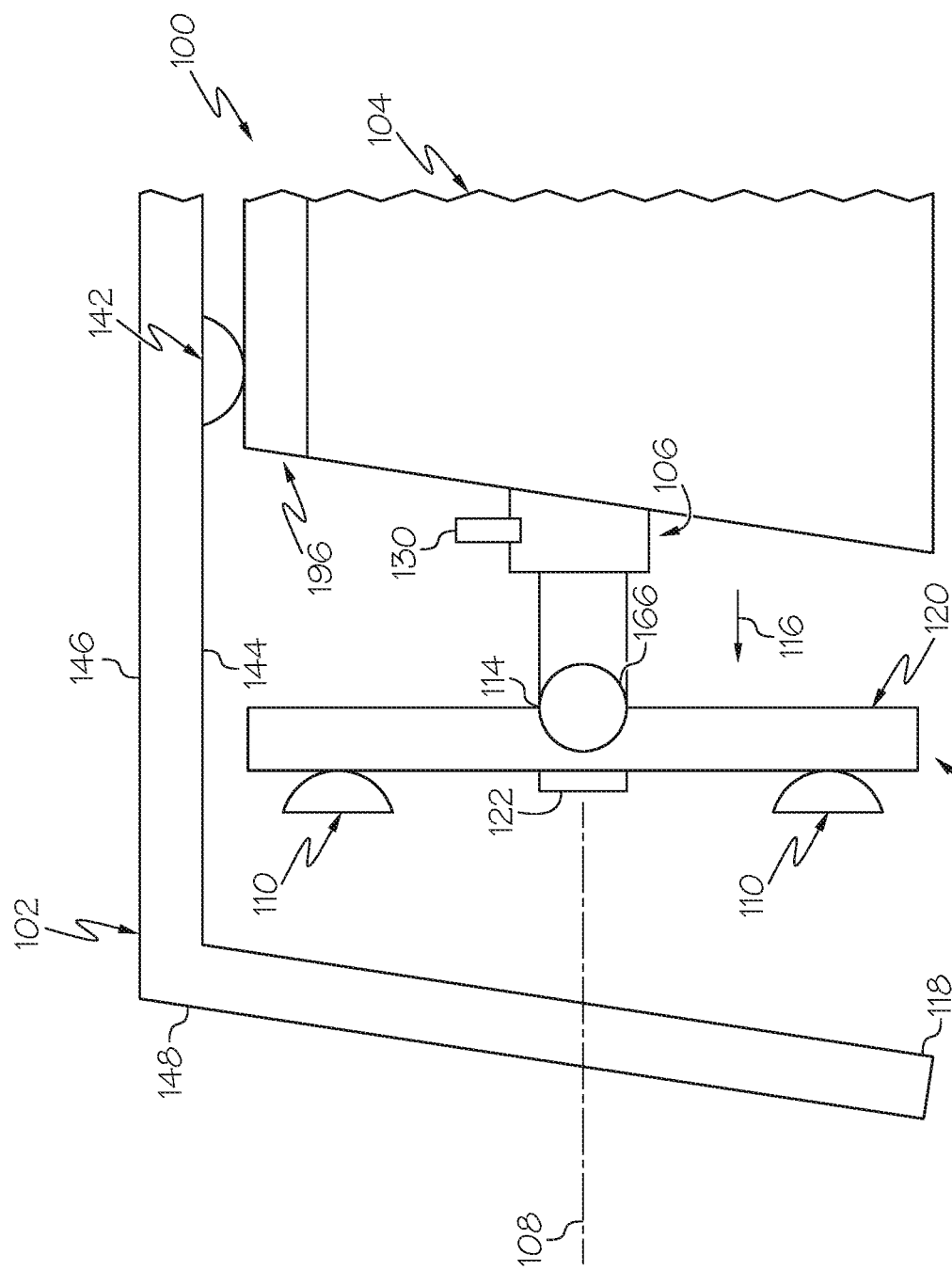
FIG. 7 is a schematic, partial, elevation view of an example of the disclosed apparatus depicting a first position of a linear actuator.
Figure 8:
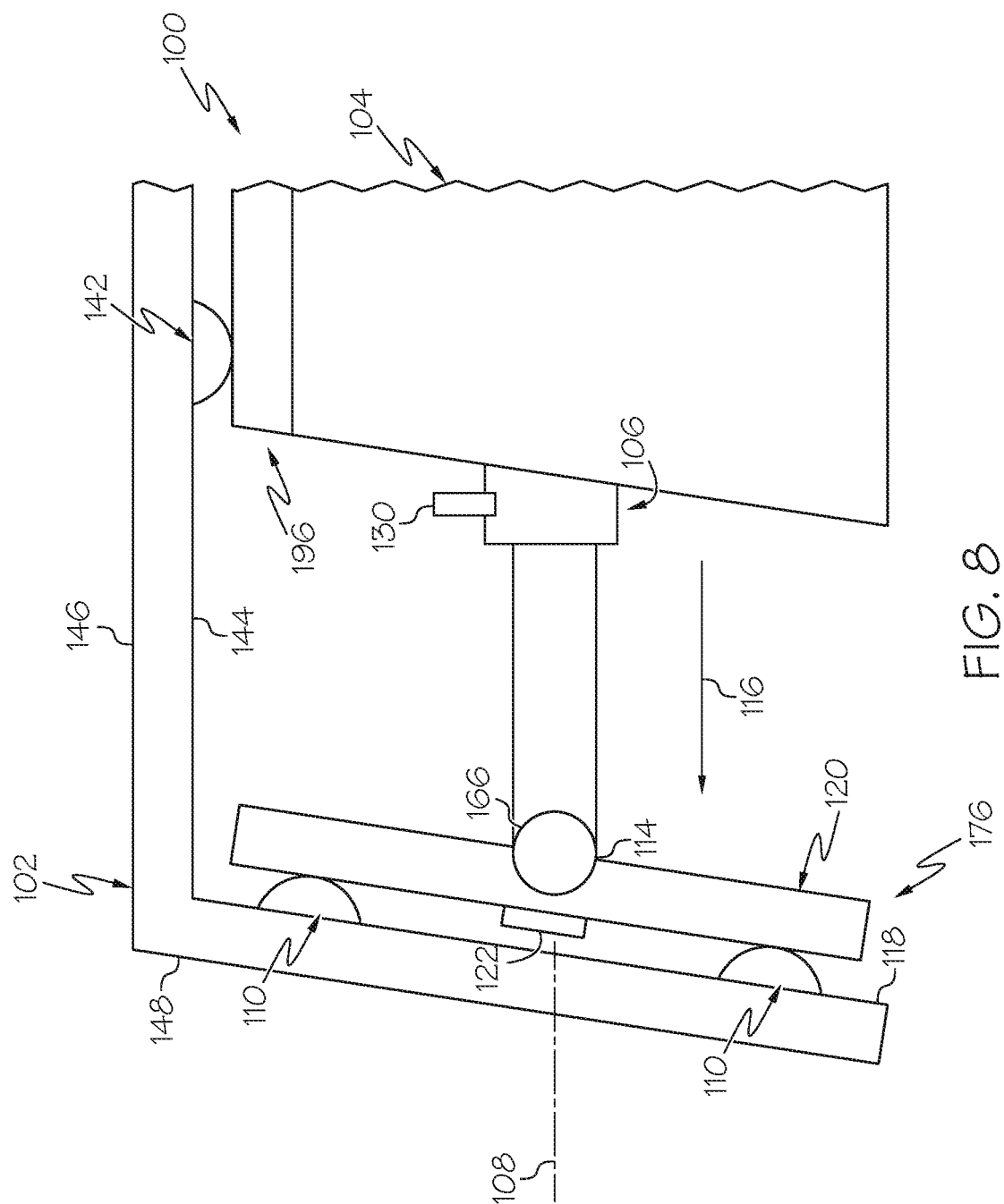
FIG. 8 is a schematic, partial, elevation view of an example of the disclosed apparatus of FIG. 7 depicting a second position of the linear actuator.
Figure 9:
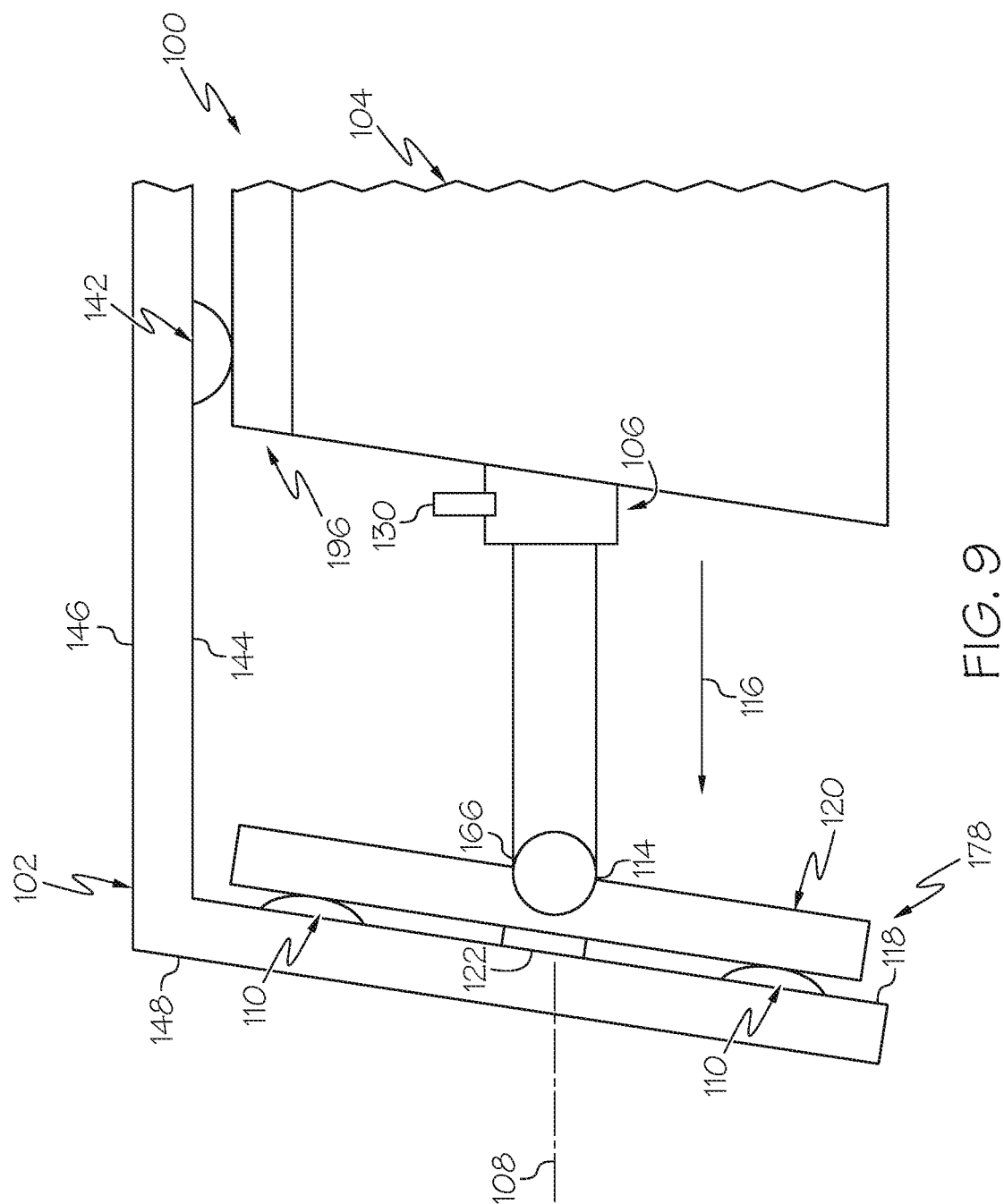
FIG. 9 is a schematic, partial, elevation view of an example of the disclosed apparatus of FIG. 7 depicting a third position of the linear actuator.

Referring to FIGS. 7-9, an example implementation of the apparatus 100 being used to grip and support the workpiece 102 is disclosed. In should be understood that FIGS. 7-9 illustrate an example of one of the linear actuators (the linear actuator 106) relative to a portion of the workpiece 102 and that while not explicitly illustrated in FIGS. 7-9, in some examples, the second linear actuator 126 and/or the third linear actuator 188 are structurally and/or functionally same as the example of the linear actuator 106 illustrated in FIGS. 7-9. Thus, reference made to the linear actuator 106 and the component associated therewith (e.g., the vacuum gripper 110, the vacuum foot 120, the pivot coupling 166, a sensor 122, and/or an actuator stop-lock 130) in the following description with respect to FIGS. 7-9 may also refer to the second linear actuator 126 and the components associated therewith (e.g., the second vacuum gripper 138, the second vacuum foot 160, the second pivot coupling 168, a second sensor 222, and/or a second actuator stop-lock 224), and/or the third linear actuator 188 and the components associated therewith (e.g., the third vacuum gripper 142, the third vacuum foot 196, the third pivot coupling 180, a third sensor 226, and/or a third actuator stop-lock 228).

In an example, the linear actuator 106 moves the outboard end 114, including the vacuum gripper 110 and/or the vacuum foot 120 located at the outboard end 114, through a range of movement between a rest (e.g., a first) position 174 (FIG. 7) and an actuated (e.g., a second) position 176 (FIG. 8). In an example, a negative pressure generated by the vacuum formed between the vacuum gripper 110 and the surface 118 of the workpiece 102 moves the outboard end 114 through a range of motion between the actuated position 176 and a lock (e.g., a third) position 178 (FIG. 9).

In an example, the linear actuator 106 is configured to selectively, linearly move the outboard end 114, including the vacuum gripper 110 and/or the vacuum foot 120, in a first direction (indicated by directional arrow 116) relative to the fixture base 104 and the surface 118 of the workpiece 102 along the movement axis 108 from the rest position 174 (FIG. 7) into the actuated position 176 (FIG. 8) in which the vacuum gripper 110 is in contact with the surface 118 of the workpiece 102. With the vacuum gripper 110 in contact with the surface 118 of the workpiece 102 (FIG. 8), the linear actuator 106 is configured to enable free linear movement of the outboard end 114, including the vacuum gripper 110 and/or the vacuum foot 120, in the first direction 116 along the movement axis 108. As used herein, "free," for example, in reference to movement, refers to unrestricted or unobstructed movement of the element to which the term refers. The vacuum formed between the vacuum gripper 110 and the surface 118 of the workpiece 102 urges linear movement of the outboard end 114 in the first direction 116 along the movement axis 108 into the lock position 178 (FIG. 9).

With the outboard end 114 of the linear actuator 106 in the lock position 178, the linear actuator 106 fixes the outboard end 114, including the vacuum gripper 110 and/or the vacuum foot 120, in the lock position 178 (FIG. 9). In an example, the apparatus 100 also includes the actuator stop-lock 130 coupled with the linear actuator 106 and operable to fix, or lock, the outboard end 114 of the linear actuator 106, and the vacuum gripper 110 and/or the vacuum foot 120, in the lock position 178.

The vacuum formed between the vacuum gripper 110 and the surface 118 of the workpiece 102 securely holds the workpiece 102. Movement of the outboard end 114 of the linear actuator 106 toward the workpiece 102, rather than movement of the workpiece 102 toward the outboard end 114, in response to the negative pressure generated by the vacuum, prevents inducing a load in the workpiece 102. Fixing the linear position of the outboard end 114 of the linear actuator 106 in the lock position 178 supports the workpiece 102 from behind.

In an example, the apparatus 100 also include the sensor 122 operable to detect when the vacuum gripper 110 is in contact with the surface 118 of the workpiece 102. The sensor 122 is communicatively coupled to a controller 184. In an example, the sensor 122 is located at the outboard end 114 of the linear actuator 106. In an example, the sensor 122 is located proximate to the vacuum gripper 110. In an example, the sensor 122 is coupled to the vacuum foot 120. In an example, the sensor 122 is a position sensor. In an example, the sensor 122 is a contact sensor. In an example, the sensor 122 is a proximity sensor.

In an example, once the sensor 122 detects that the vacuum gripper 110 is in contact with the surface 118 and the linear actuator 106 is in the actuated position 176 (FIG. 6), the linear actuator 106 is commanded to cease linearly moving the outboard end 114, including the vacuum gripper 110 and/or the vacuum foot 120. Once selectively controlled linear movement of the outboard end 114 has stopped, the linear actuator 106 disengages control of and releases the outboard end 114 (enables free linear movement of the outboard end 114). The vacuum is applied to the surface 118 of the workpiece 102 by the vacuum gripper 110 to grip the workpiece 102. The vacuum draws, or otherwise pulls, the outboard end 114 toward the workpiece 102 and positions the outboard end 114 in the lock position 178 (FIG. 9).

Figure 10:
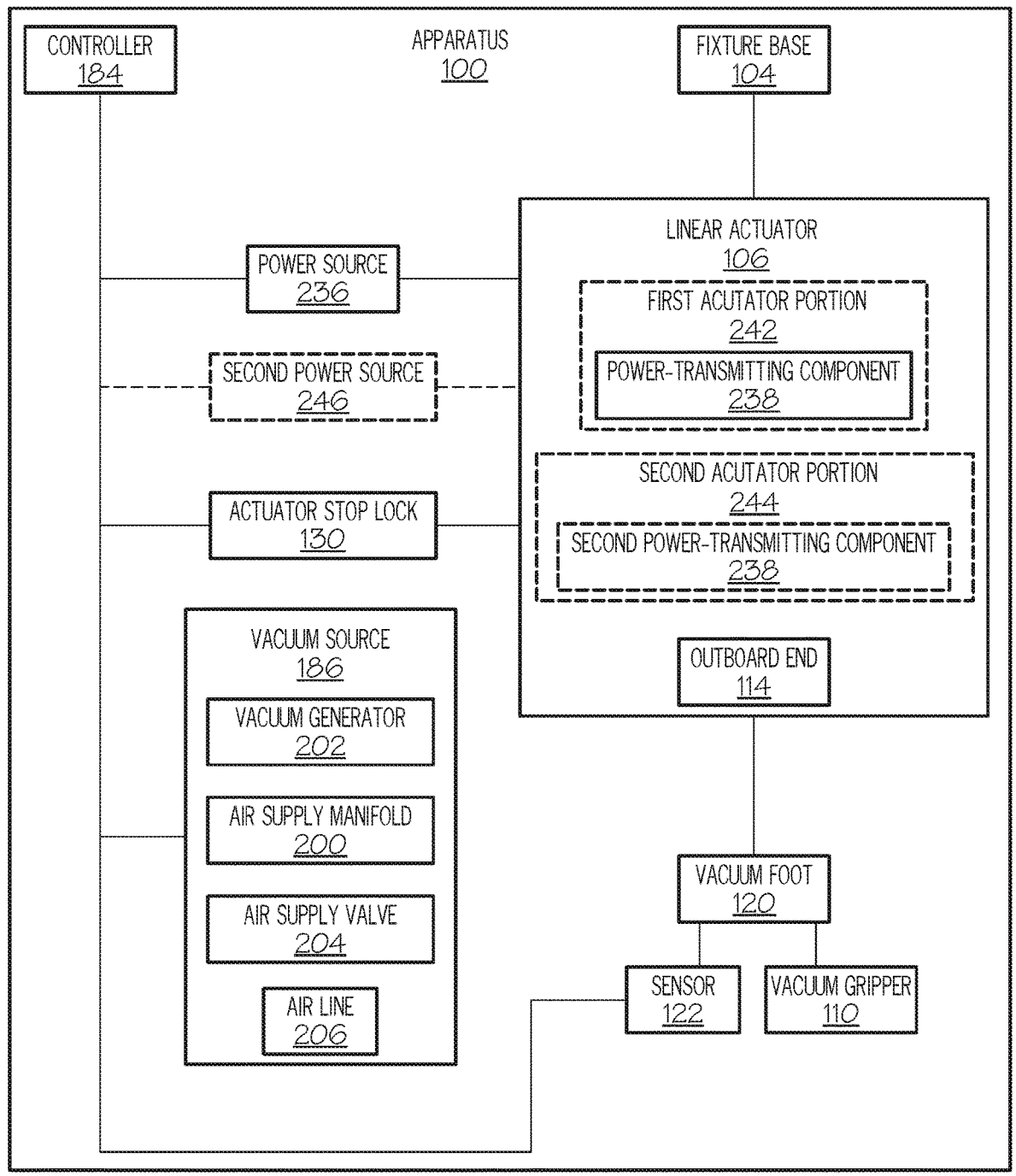
FIG. 10 is a schematic block diagram of an example of the disclosed apparatus.

Referring to FIG. 10, an example of the apparatus 100 is disclosed. It should be understood that FIG. 10 illustrates a portion of the apparatus 100 including one of the linear actuators (e.g., the linear actuator 106) and that while not explicitly illustrated in FIG. 10, in some examples, the second linear actuator 126 and/or the third linear actuator 188 are structurally and/or functionally the same of the example of the linear actuator 106 illustrated in FIG. 10. Thus, reference made to the linear actuator 106 and the components associated therewith in the following description with respect to FIG. 10 may also refer to the second linear actuator 126 and the components associated therewith, and/or the third linear actuator 188 and the components associated therewith.

In an example, the apparatus 100 includes a vacuum source 186 that is communicatively coupled with the vacuum gripper 110. In an example, the vacuum source 186 is communicatively coupled with the vacuum gripper 110 via the vacuum foot 120.

In an example, the vacuum source 186 includes at least one air supply manifold 200, communicatively coupled with the vacuum gripper 110, for example, via the vacuum foot 120. The vacuum source 186 also includes least one vacuum generator 202, communicatively coupled with the air supply manifold 200. The vacuum source 186 also includes at least one air supply valve 204 and at least one air line 206 to control and direct the flow of air. In an example, the air supply valve 204 is an electrically controlled solenoid valve that is operatively coupled with and commanded by the controller 184.

In an example, the vacuum generator 202 includes a vacuum pump. In this example, in order to generate the vacuum sufficient to rigidly hold the workpiece 102, the vacuum generator 202 pulls a vacuum that is sent through the air line 206 to the air supply manifold 200, which then distributes the vacuum to the vacuum gripper 110, the second vacuum gripper 138, and/or the third vacuum gripper 142. The air supply valve 204 controls the flow of air to the air supply manifold 200.

In an example, the vacuum generator 202 is a venturi vacuum generator. The air supply manifold 200 is divided into an air supply port and a vacuum plenum. In this example, in order to generate the vacuum sufficient to rigidly hold the workpiece 102, high pressure air (e.g., from an air compressor) is provided to the vacuum generator 202 by the air supply valve 204 via the air line 206. The vacuum generator 202 receives the high-pressure air from the air supply port. The supply air passes through a vacuum venturi section of the vacuum generator 202, which pulls a vacuum on the vacuum plenum. Thereafter, air exits from the vacuum generator 202 via outlets.

In an example, the apparatus 100 includes power source 236 that is communicatively and operatively coupled with the linear actuator 106. The linear actuator 106 includes a power-transmitting component 238 operatively coupled to the power source 236 and configured to drive linear movement of the linear actuator 106.

In an example, the controller 184 includes a processor and at least one input/output device. The controller 184 operates and controls various functions and components of the apparatus 100. In an example, the controller 184 controls linear movement of the linear actuator 106, for example, via control of the power source 236 and the power-transmitting component 238 and/or control of the actuator stop-lock 130 based on signals from the sensor 122 indicative of the position of the outboard end 114 of the linear actuator 106. In an example, the controller 184 controls application of the vacuum by the vacuum gripper 110, for example, via control of the vacuum source 186. The apparatus 100 also includes at least one power supply (not shown) that provides power as needed to the various components of the apparatus 100.

Figure 11:
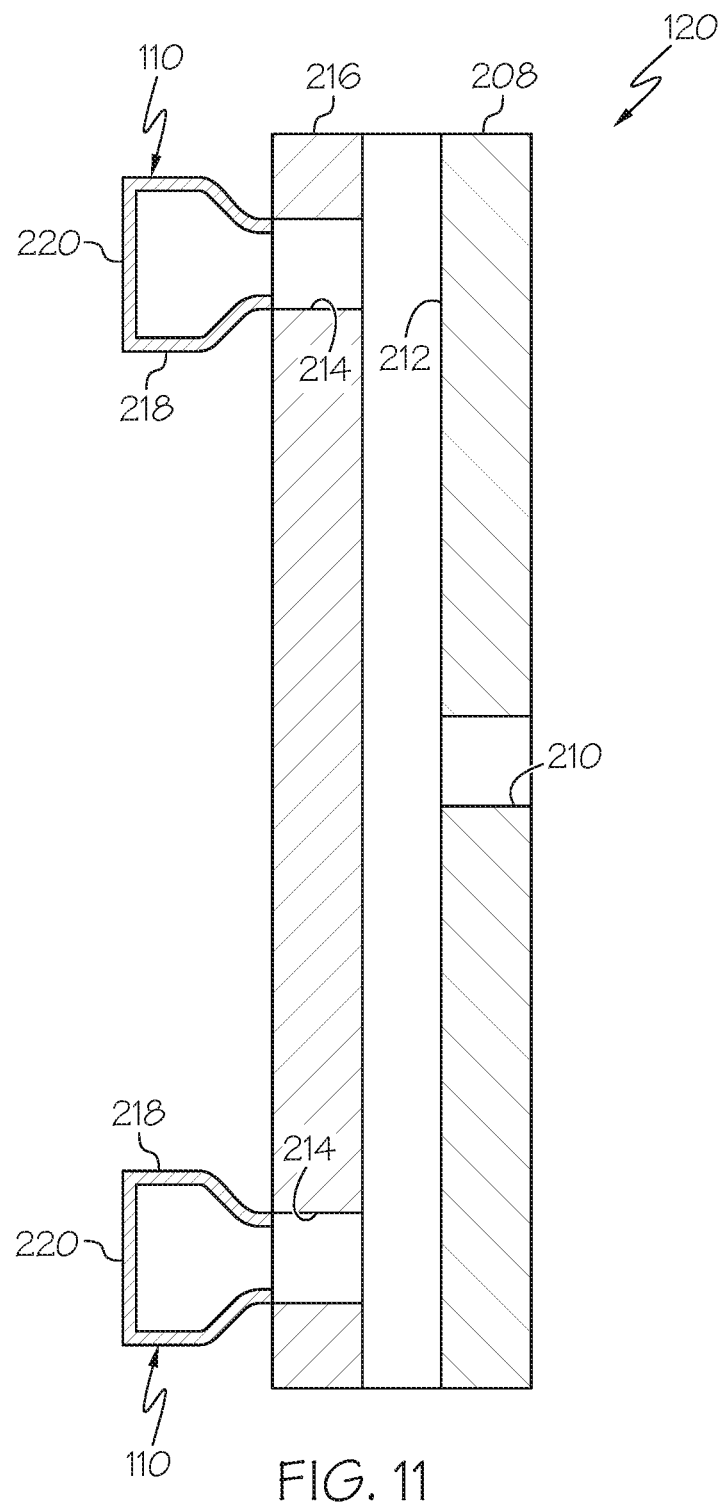
FIG. 11 is a schematic, elevation, sectional view of an example of a vacuum foot of the disclosed apparatus.

Referring to FIG. 11, an example of the vacuum foot 120 is disclosed. It should be understood that FIG. 11 illustrates one of the vacuum feet (e.g., the vacuum foot 120) and that while not explicitly illustrated in FIG. 11, in some examples, the second vacuum foot 160 and/or the third vacuum foot 196 are structurally and/or functionally the same of the example of the vacuum foot 120 illustrated in FIG. 11. Thus, reference made to the vacuum foot 120 and the components associated therewith in the following description with respect to FIG. 11 may also refer to the second vacuum foot 160 and the components associated therewith, and/or the third vacuum foot 196 and the components associated therewith.

In essence, the vacuum foot 120 functions as a mounting platform upon which other components of the apparatus 100 are mounted. In an example, the vacuum foot 120 includes a vacuum manifold 208. The vacuum manifold 208 includes at least one vacuum port 210 that is communicatively coupled with the air supply manifold 200 (FIG. 10). The vacuum manifold 208 also includes at least one vacuum passage 212 that is communicatively coupled with the vacuum port 210.

In an example, the air supply manifold 200 (FIG. 10) is mounted on the vacuum foot 120 and communicates directly with the vacuum port 210.

In an example, the air supply manifold 200 (FIG. 10) is located remotely relative to the vacuum foot 120 and communicates with the vacuum port 210 via the air line 206 (FIG. 7), which is connected to the vacuum foot 120.

In an example, the vacuum foot 120 also includes a workpiece interface plate 216 that is coupled to the vacuum manifold 208. The workpiece interface plate 216 includes at least one vacuum conduit 214. The vacuum gripper 110 is coupled to the workpiece interface plate 216 and is in communication with the vacuum conduit 214. The vacuum within the vacuum passage 212 is communicated to the vacuum gripper 110 via the vacuum conduit 214.

In an example, the vacuum gripper 110 includes a flexible gripper body 218 that is coupled to the workpiece interface plate 216. The gripper body 218 defines an internal chamber that is communicatively coupled with the vacuum conduit 214. The vacuum gripper 110 also includes a lip 220 that extends about a perimeter of the internal chamber and that forms a sealing surface for contact with the surface 118 of the workpiece 102 when the vacuum gripper 110 is placed against the workpiece 102. The size, cross-sectional shape, and/or material of the vacuum gripper 110 is such that the lip 220 forms a seal with the surface 118 of the workpiece 102 with negligible loss of vacuum inside the internal chamber and the gripper body 218 conforms to accommodate compression of the vacuum gripper 110 as the vacuum is applied.

Figure 12:
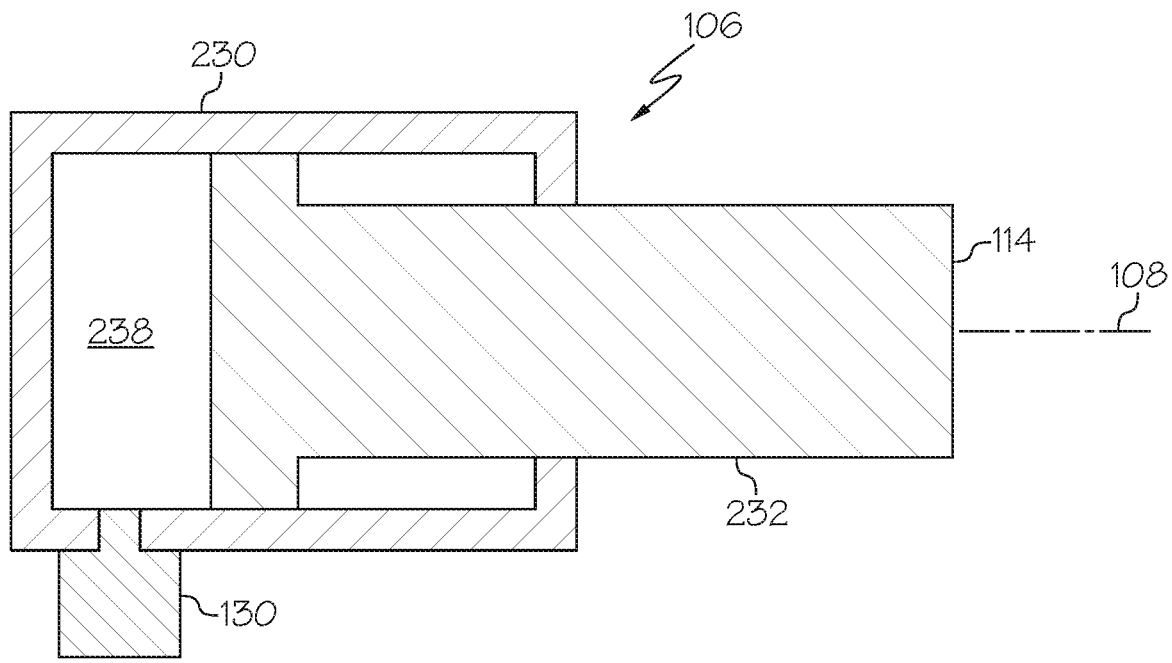
FIG. 12 is a schematic, elevation, sectional view of an example of the linear actuator of the disclosed apparatus.

Referring to FIG. 12, an example of the linear actuator 106 is disclosed. It should be understood that FIG. 12 illustrates an example of one of the linear actuators (e.g., the linear actuator 106) and that while not explicitly illustrated in FIG. 12, in some examples, the second linear actuator 126 and/or the third linear actuator 188 are structurally and/or functionally the same of the example of the linear actuator 106 illustrated in FIG. 12. Thus, reference made to the linear actuator 106 and the components associated therewith in the following description with respect to FIG. 12 may also refer to the second linear actuator 126 and the components associated therewith, and/or the third linear actuator 188 and the components associated therewith.

In an example, the linear actuator 106 includes a stationary member 230 that is coupled to the fixture base 104 and a movable member 232 that is coupled to the stationary member 230. The movable member 232 is linearly movable relative to the stationary member 230 along the movement axis 108. A free end of the movable member 232 defines the outboard end 114 of the linear actuator 106. The power-transmitting component 238 is operatively coupled with the power source 236 and with the stationary member 230 and the movable member 232. The power-transmitting component 238 is operable to selectively drive linear movement of the movable member 232 relative to the stationary member 230 along the movement axis 108, for example, between the rest position 174 (FIG. 7) and the actuated position 176 (FIG. 8). Once in the actuated position 176, and with the vacuum gripper 110 in contact with the surface 118 of the workpiece 102, the power-transmitting component 238 is configured to enable free linear movement of the movable member 232 relative to the stationary member 230. The vacuum created by the vacuum gripper 110 linearly moves the movable member 232 from the actuated position 176 to the lock position 178 (FIG. 9). The actuator stop-lock 130 is operatively coupled with the power-transmitting component 238 to lock linear movement of the movable member 232 relative to the stationary member 230 along the movement axis 108, for example, when the linear actuator 106 is in the lock position 178.

In an example, the linear actuator 106 is a hydraulic linear actuator, the power source 236 is a hydraulic pump, and the power-transmitting component 238 is pressurized hydraulic fluid. In this example, the stationary member 230 includes a hollow cylinder and the movable member 232 includes a piston located inside the hollow cylinder and a piston rod coupled to the piston (a free end of the piston rod defines the outboard end 114 of the linear actuator 106). The pressurized hydraulic fluid within the hollow cylinder acts on the piston and drives linear movement of the piston. The actuator stop-lock 130 is a hydraulic valve that is operable to close off the hydraulic system and hydrostatically lock the hydraulic actuator.

In an example, the linear actuator 106 is a pneumatic linear actuator, the power source 236 is a compressor, and the power-transmitting component 238 is pressurized gas (e.g., air). In this example, the stationary member 230 includes a hollow cylinder and the movable member 232 includes a piston located inside the hollow cylinder and a piston rod coupled to the piston (a free end of the piston rod defines the outboard end 114 of the linear actuator 106). The pressurized gas within the hollow cylinder acts on the piston and drives linear movement of the piston. The actuator stop-lock 130 is a pneumatic valve that is operable to close off the pneumatic system and lock the pneumatic actuator.

In an example, the linear actuator 106 is a mechanical or electromechanical linear actuator, the power source 236 is a motor, and the power-transmitting component 238 includes a drive mechanism that operates to convert rotary motion of the motor into linear motion of the movable member 232 (e.g., a screw drive, rack and pinion drive, a chain drive, a belt drive, and the like). In this example, the stationary member 230 includes a hollow housing and the movable member 232 includes a rod (a free end of the rod defines the outboard end 114 of the linear actuator 106). The drive mechanism within the hollow housing acts on the rod and drives linear movement of the rod. The actuator stop-lock 130 is a mechanical rod lock that is operable to restrict operation of the drive mechanism.

Figure 13:
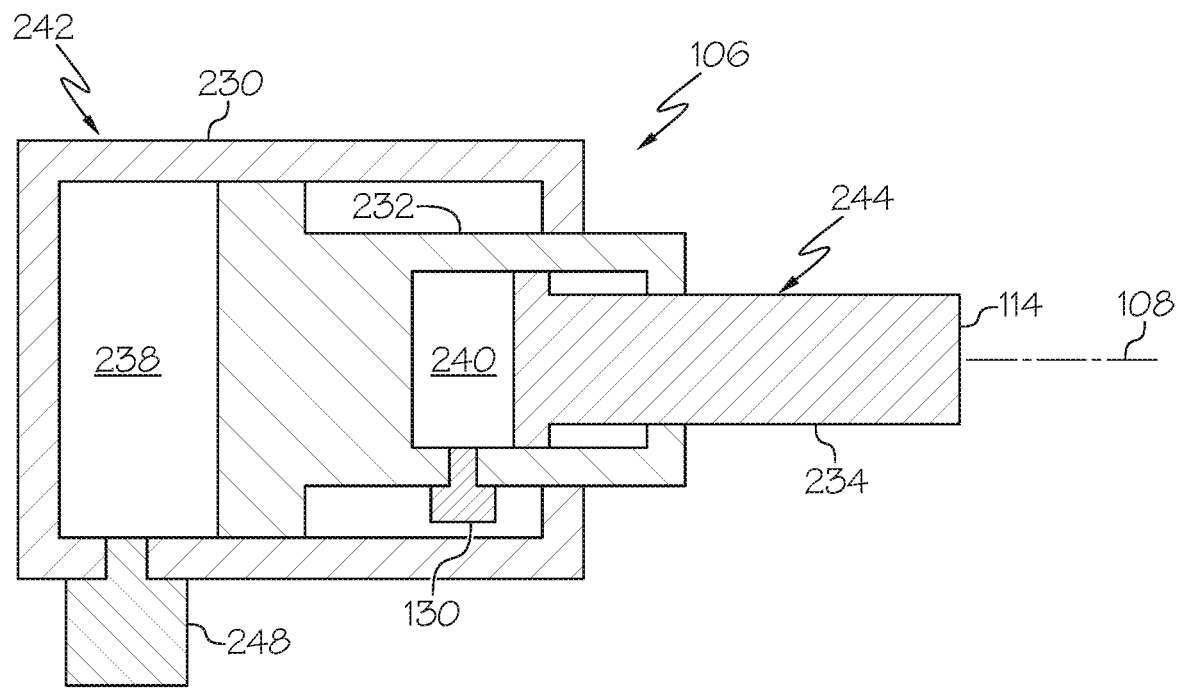
FIG. 13 is a schematic, elevation, sectional view of an example of the linear actuator of the disclosed apparatus.

Referring to FIG. 13, an example of the linear actuator 106 is disclosed. It should be understood that FIG. 13 illustrates an example of one of the linear actuators (e.g., the linear actuator 106) and that while not explicitly illustrated in FIG. 13, in some examples, the second linear actuator 126 and/or the third linear actuator 188 are structurally and/or functionally the same of the example of the linear actuator 106 illustrated in FIG. 13. Thus, reference made to the linear actuator 106 and the components associated therewith in the following description with respect to FIG. 13 may also refer to the second linear actuator 126 and the components associated therewith, and/or the third linear actuator 188 and the components associated therewith.

In an example, the linear actuator 106 includes a first actuator portion 242 and a second actuator portion 244. For example, the linear actuator 106 is a multi-stage actuator in which the first actuator portion 242 selectively linearly moves the linear actuator 106 between the rest position 174 (FIG. 7) and the actuated position 176 (FIG. 8) and the second actuator portion 244 enables free linear movement of the linear actuator 106 from the actuated position 176 to the lock position 178 (FIG. 9).

In an example, the first actuator portion 242 includes the stationary member 230 that is coupled to the fixture base 104 and the movable member 232 that is coupled to the stationary member 230. The movable member 232 is linearly movable relative to the stationary member 230 along the movement axis 108. The power-transmitting component 238 is operatively coupled with the power source 236 and with the stationary member 230 and the movable member 232. The power-transmitting component 238 is operable to selectively drive linear movement of the movable member 232 relative to the stationary member 230 along the movement axis 108, for example, between the rest position 174 (FIG. 7) and the actuated position 176 (FIG. 8). Once in the actuated position 176, and with the vacuum gripper 110 in contact with the surface 118 of the workpiece 102, the power-transmitting component 238 is configured to fix linear movement of the movable member 232 relative to the stationary member 230, for example, by another actuation stop-lock 248.

The second actuator portion 244 includes a second movable member 234 that is coupled to the movable member 232. The second movable member 234 is linearly movable relative to the movable member 232 along the movement axis 108. A free end of the second movable member 234 defines the outboard end 114 of the linear actuator 106. A second power-transmitting component 240 is operatively coupled with a second power source 246 and with the movable member 232 and the second movable member 234. The second power-transmitting component 240 is operable to enable free linear movement of the second movable member 234 relative to the movable member 232 along the movement axis 108, for example, between the actuated position 176 (FIG. 8) and the lock position 178 (FIG. 9). Once in the actuated position 176, and with the vacuum gripper 110 in contact with the surface 118 of the workpiece 102, the vacuum created by the vacuum gripper 110 linearly moves the second movable member 234 from the actuated position 176 to the lock position 178. The actuator stop-lock 130 is operatively coupled with the second power-transmitting component 240 to lock linear movement of the second movable member 234 relative to the movable member 232 along the movement axis 108, for example, when the linear actuator 106 is in the lock position 178.

In various examples, the first actuator portion 242 is any one of the hydraulic linear actuator, the pneumatic linear actuator, or the mechanical linear actuator, for example, as described herein in reference to FIG. 12.

In an example, the second actuator portion 244 is a hydraulic linear actuator, the second power source 246 is a hydraulic pump, and the second power-transmitting component 240 is pressurized hydraulic fluid. In this example, the movable member 232 also includes a hollow cylinder and the second movable member 234 includes a piston located inside the hollow cylinder and a piston rod coupled to the piston (a free end of the piston rod defines the outboard end 114 of the linear actuator 106). The pressurized hydraulic fluid within the hollow cylinder acts on the piston and drives linear movement of the piston. The actuator stop-lock 130 is a hydraulic valve that is operable to close off the hydraulic system and hydrostatically lock the hydraulic actuator.

In an example, the second actuator portion 244 is a pneumatic linear actuator, the second power source 246 is a compressor, and the second power-transmitting component 240 is pressurized gas (e.g., air). In this example, the movable member 232 also includes a hollow cylinder and the second movable member 234 includes a piston located inside the hollow cylinder and a piston rod coupled to the piston (a free end of the piston rod defines the outboard end 114 of the linear actuator 106). The pressurized gas within the hollow cylinder acts on the piston and drives linear movement of the piston. The actuator stop-lock 130 is a pneumatic valve that is operable to close off the pneumatic system and lock the pneumatic actuator.

In an example, the second actuator portion 244 is a mechanical or electromechanical linear actuator, the second power source 246 is a motor, and the second power-transmitting component 240 includes a drive mechanism that operates to convert rotary motion of the motor into linear motion of the second movable member 234 (e.g., a screw drive, rack and pinion drive, a chain drive, a belt drive, and the like). In this example, the movable member 232 also includes a hollow housing and the second movable member 234 includes a rod (a free end of the rod defines the outboard end 114 of the linear actuator 106). The drive mechanism within the hollow housing acts on the rod and drives linear movement of the rod. The actuator stop-lock 130 is a mechanical rod lock that is operable to restrict operation of the drive mechanism.

Referring to FIGS. 14-18, the apparatus 100 is adaptable to different workpieces 102 having various shapes and/or configurations of structural members.

Figure 14:
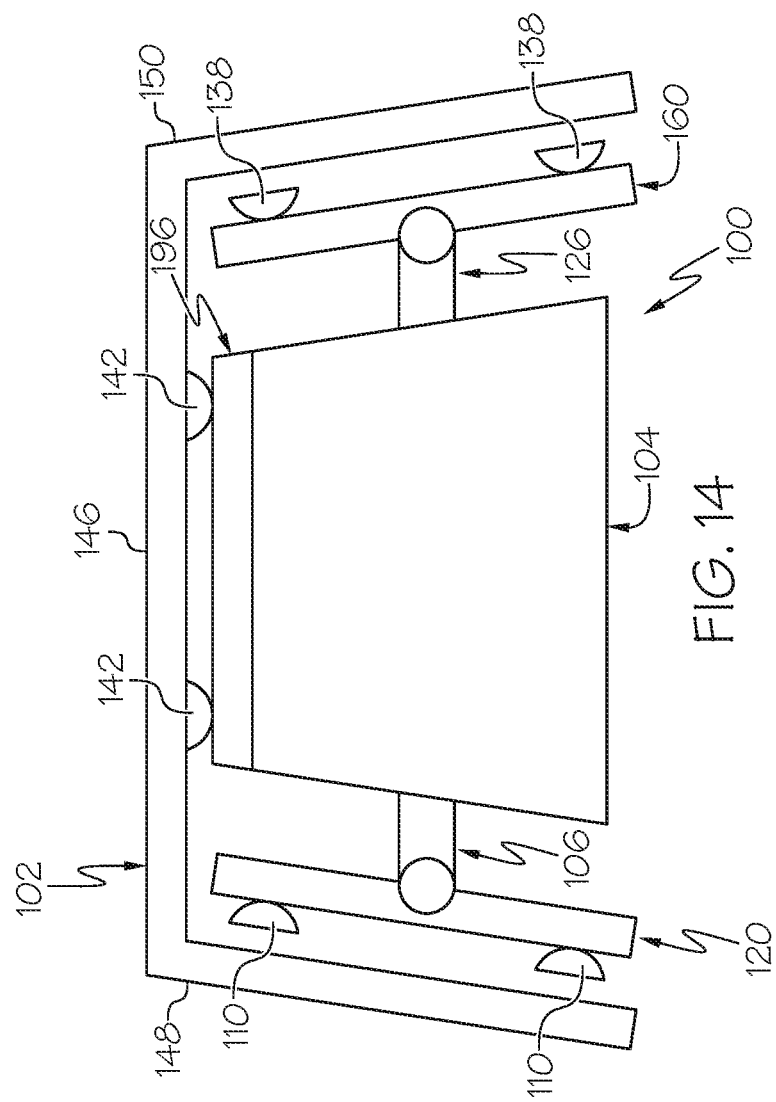
FIG. 14 is a schematic, elevation view of the disclosed apparatus being used to hold and support an example of the workpiece.

As illustrated in FIG. 14, in an example of the workpiece 102, the end of the web 146 is connected to an end of the flange 148 and the other end of the web 146 is connected to an end of the second flange 150 and both the flange 148 and the second flange 150 project from the same side of the web 146 (commonly referred to as having a C-shape in cross-section).

Figure 15:
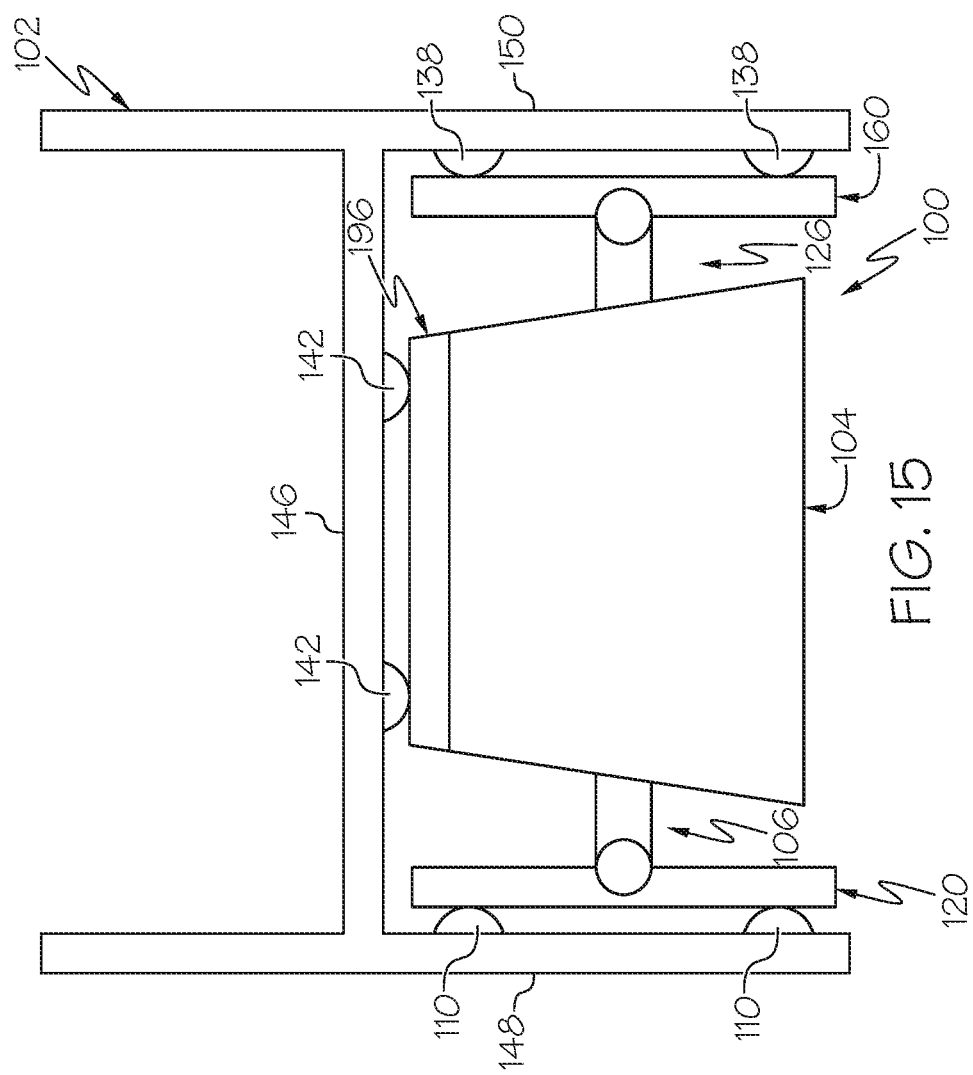
FIG. 15 is a schematic, elevation view of the disclosed apparatus being used to hold and support an example of the workpiece.

As illustrated in FIG. 15, in an example of the workpiece 102, the end of the web 146 is connected to a middle portion of the flange 148 (e.g., between the ends of the flange 148) and the other end of the web 146 is connected to a middle portion of the second flange 150 (e.g., between the ends of the second flange 150) and both the flange 148 and second flange 150 project from the both sides of the web 146 (commonly referred to as having a I-shape or H-shape in cross-section).

Figure 16:
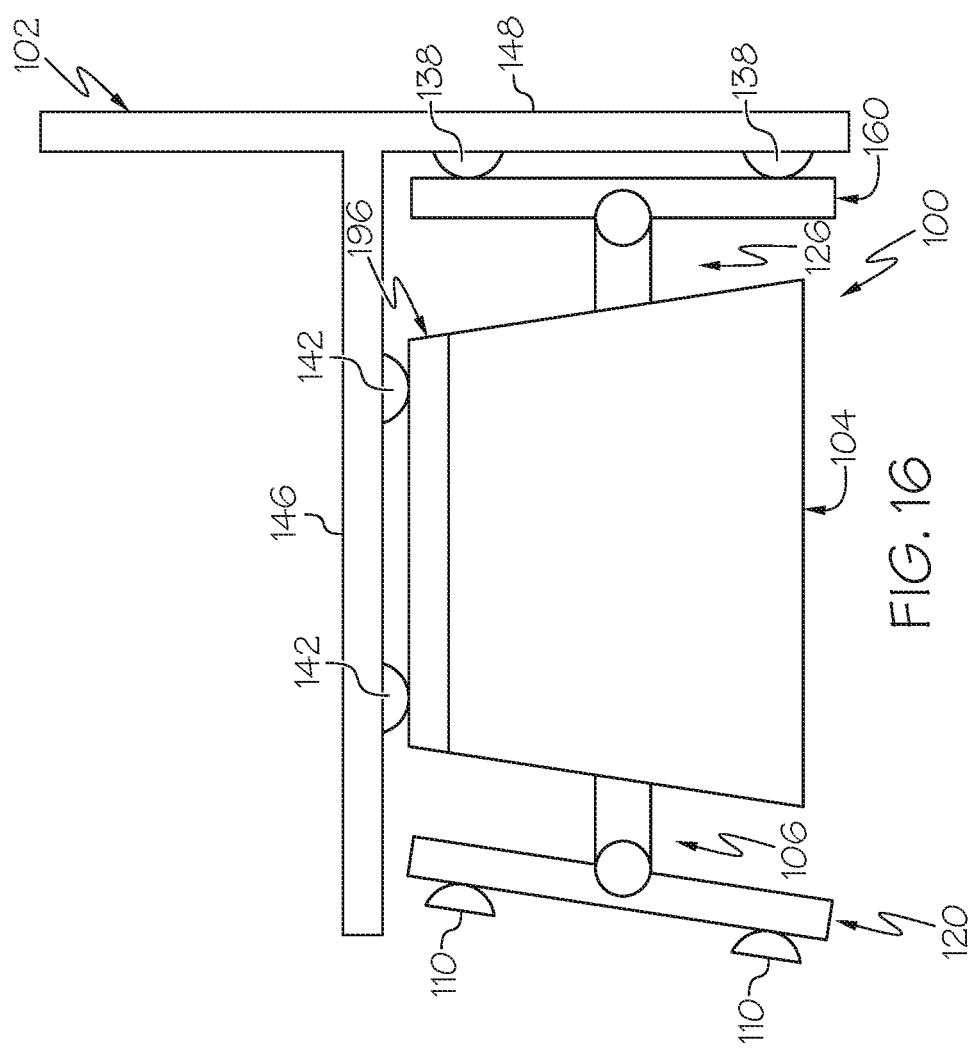
FIG. 16 is a schematic, elevation view of the disclosed apparatus being used to hold and support an example of the workpiece.

As illustrated in FIG. 16, in an example of the workpiece 102, the end of the web 146 is connected to a middle portion of the flange 148 and the flange 148 projects from the both sides of the web 146 (commonly referred to as having a T-shape in cross-section).

Figure 17:
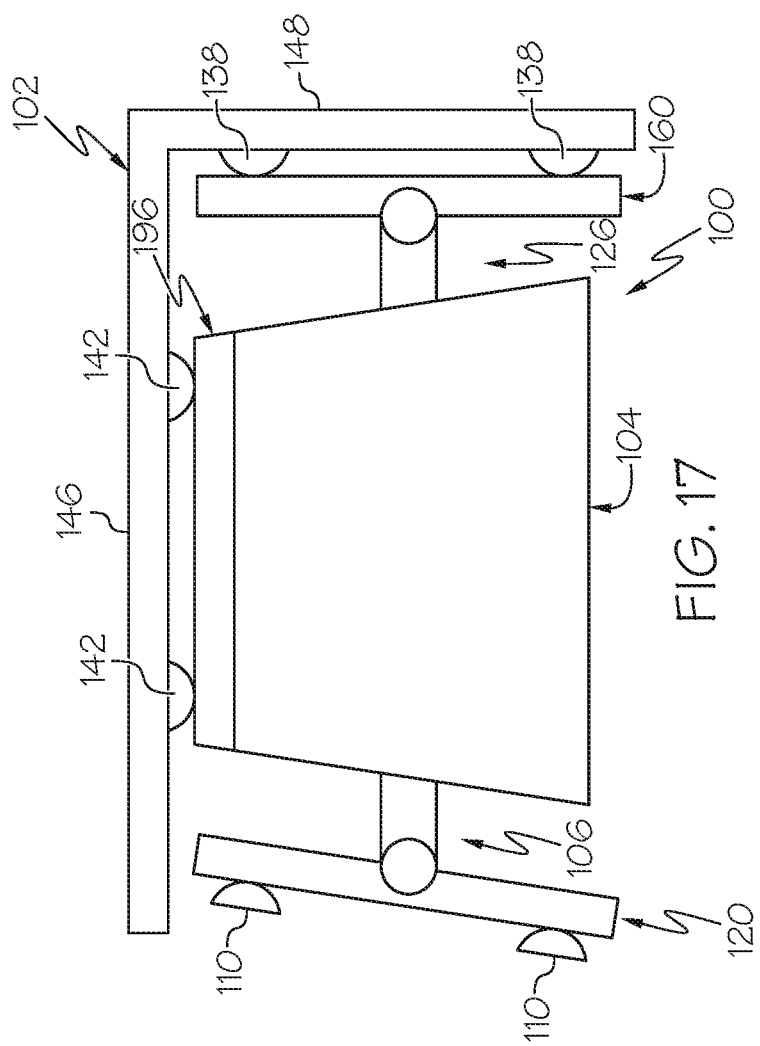
FIG. 17 is a schematic, elevation view of the disclosed apparatus being used to hold and support an example of the workpiece.

As illustrated in FIG. 17, in an example of the workpiece 102, the end of the web 146 is connected to the end the flange 148 and the flange 148 projects from one side of the web 146 (commonly referred to as having an L-shape in cross-section).

Figure 18:
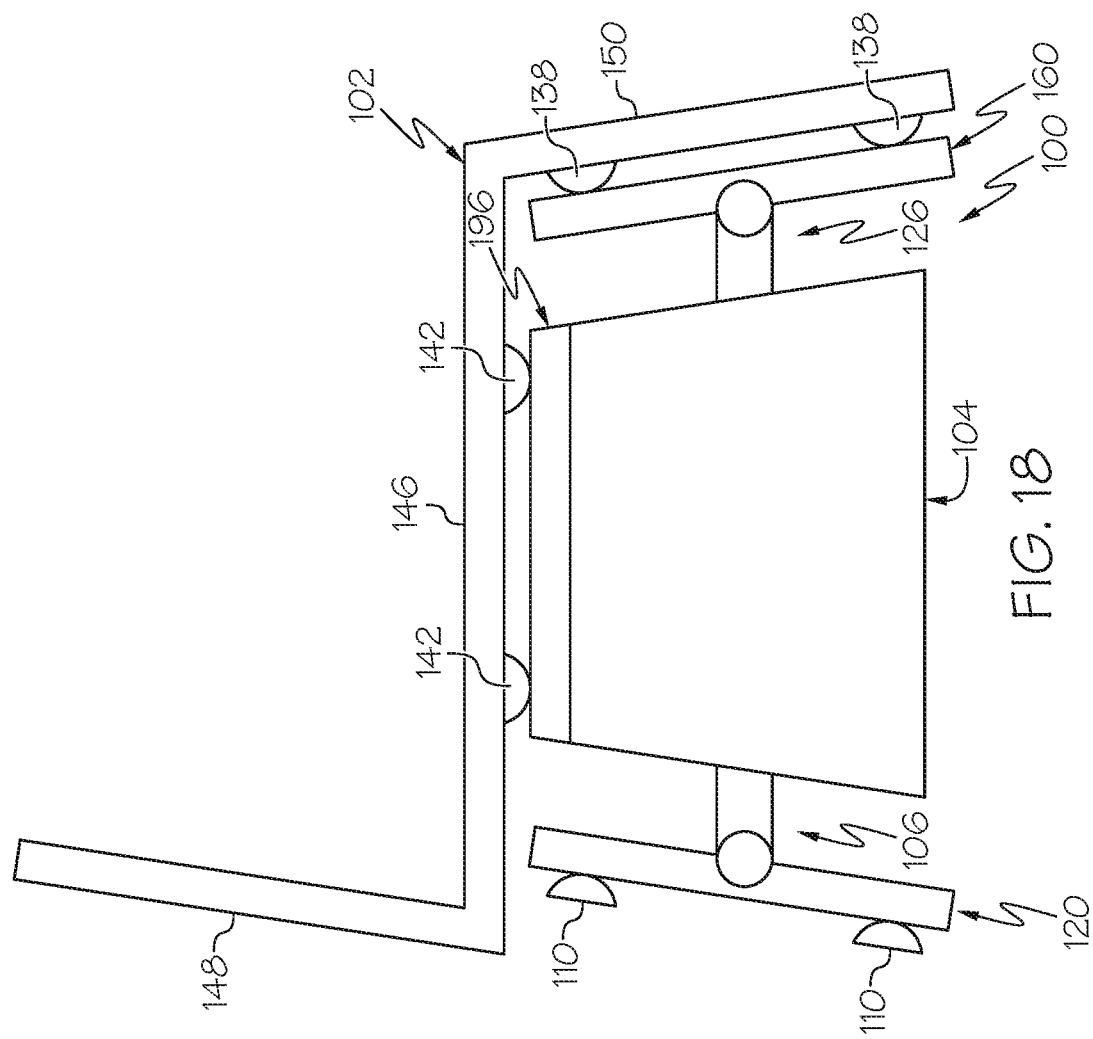
FIG. 18 is a schematic, elevation view of the disclosed apparatus being used to hold and support an example of the workpiece.

As illustrated in FIG. 18, in an example of the workpiece 102, the end of the web 146 is connected to the end of the flange 148 and the other end of the web 146 is connected to the end of the second flange 150 and the flange 148 and the second flange 150 project from opposite sides of the web 146 (commonly referred to as having a Z-shape in cross-section).

Figure 19:
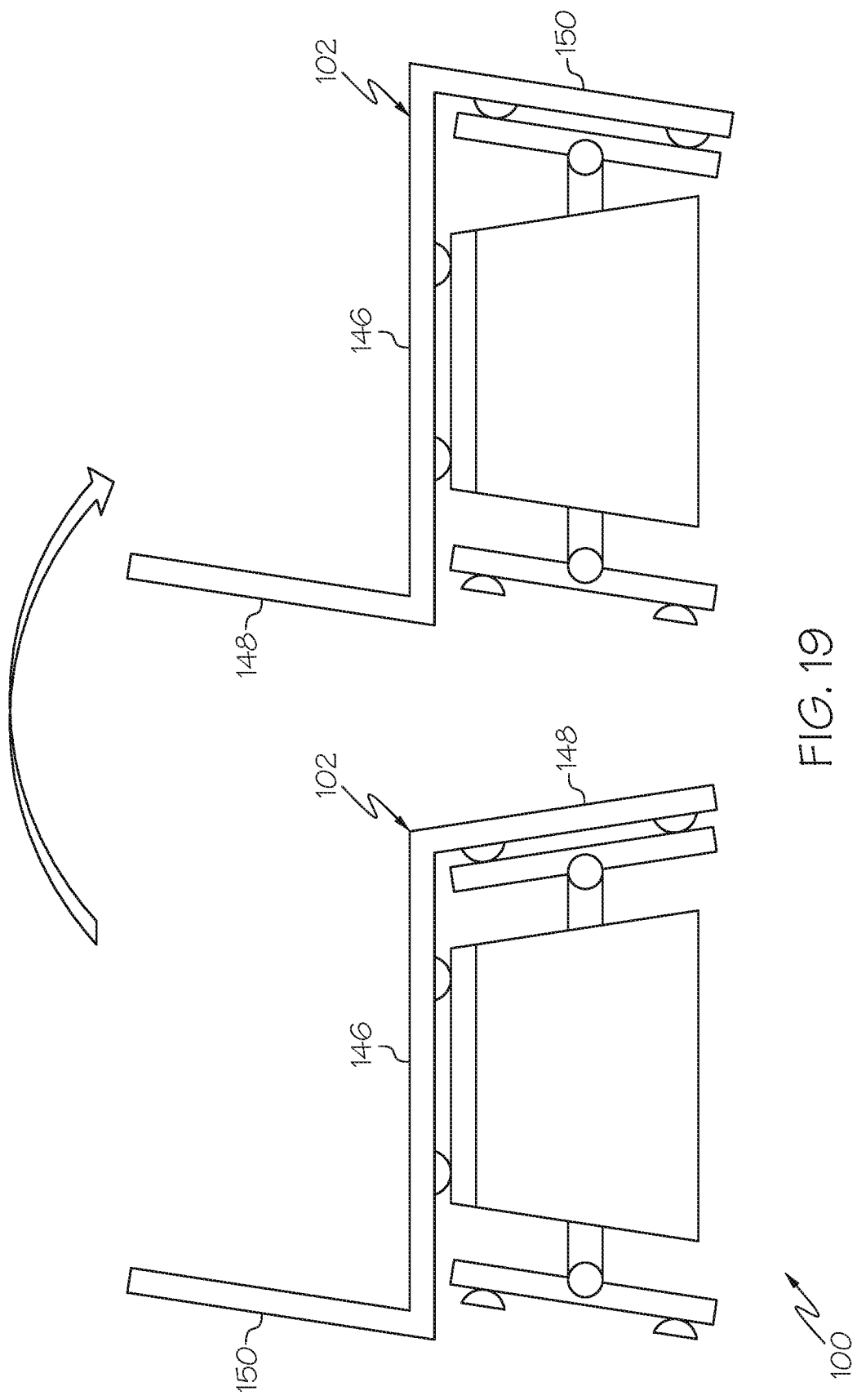
FIG. 19 is a schematic, elevation view of the disclosed apparatus depicting an example repositioning of the workpiece.

As illustrated in FIG. 19, following the machining operation being performed on one workpiece 102, another workpiece 102 having a different shape can be positioned and held by the apparatus 100 such that another workpiece 102 can undergo the machining operation. Similarly, following the machining operation being performed on one portion of the workpiece 102 (e.g., the first flange 148), the workpiece 102 can be repositioned and held by the apparatus 100 such that another portion of the workpiece 102 (e.g., the second flange 150) can undergo the machining operation. As such, workpieces 102 having different shapes and/or configurations can be quickly and easily held by the apparatus 100 without the time and lobar typically associated with adjustment and set up of a conventional holding fixture.

In some examples, the workpiece 102 includes a single structural member or element. In an example, the workpiece 102 is a sheet of material or a panel structure. In an example, the workpiece 102 has any one of various profile shapes. In an example, the profile shape of the workpiece 102 is flat (e.g., planar). In an example, profile shape of the workpiece 102 is curved along one or more dimensions. In an example, the profile shape of the workpiece 102 includes a complex contour.

In an example, the workpiece 102 is a spar of a wing of an aircraft. In this example, the web 146 is commonly referred to as a spar web and the flanges 148, 150 are commonly referred to as spar caps. In an example, the workpiece 102 is a skin panel of an aircraft.

Referring to FIGS. 1-19, in some examples (not explicitly illustrated), the apparatus 100 includes more than one linear actuator 106, each having the vacuum gripper 110, the vacuum foot 120, the pivot coupling 166, the sensor 122, and/or the actuator stop-lock 130 associated therewith. In some examples (not explicitly illustrated), the apparatus 100 includes more than one second linear actuator 126, each having the second vacuum gripper 138, the second vacuum foot 160, the second pivot coupling 168, the second sensor 222, and/or the second actuator stop-lock 224 associated therewith. In some examples (not explicitly illustrated), the apparatus 100 includes more than one third linear actuator 188, each having the third vacuum gripper 142, the third vacuum foot 196, the third pivot coupling 180, the third sensor 226, and/or the third actuator stop-lock 228 associated therewith.

Figure 20:
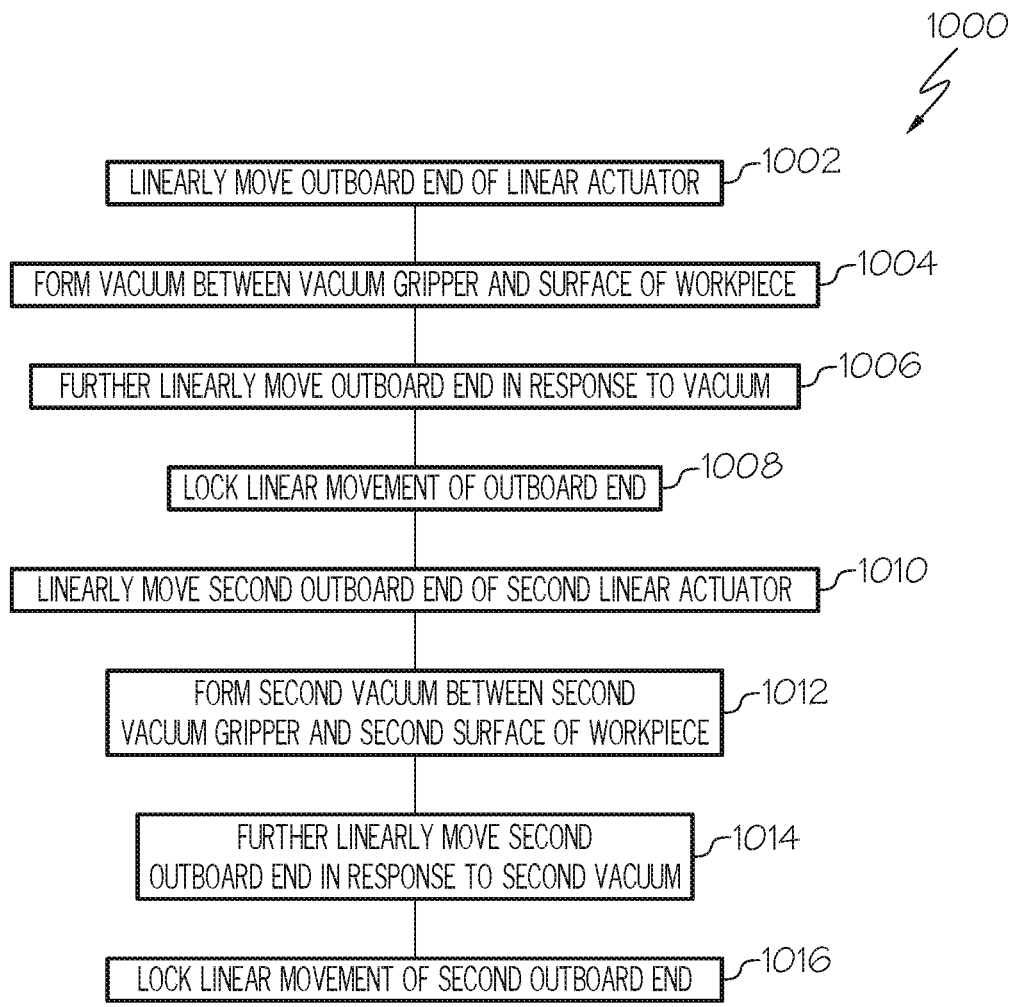
FIG. 20 is a flow diagram of an example of a disclosed method for holding the workpiece.

Referring to FIG. 20, also disclosed is an example method 1000 for holding the workpiece 102 using the disclosed apparatus 100. In an example, the method 1000 includes a step of linearly moving the outboard end 114 of the linear actuator 106 to position the vacuum gripper 110, which is located at the outboard end 114, in contact with the surface 118 of the workpiece 102, as shown at block 1002. The method 1000 also includes a step of forming a vacuum between the vacuum gripper 110 and the surface 118 of the workpiece 102, as shown at block 1004. The method 1000 also includes a step of further linearly moving the outboard end 114 of the linear actuator 106 in response to the vacuum formed between the vacuum gripper 110 and the surface 118 of the workpiece 102, as shown at block 1006. The method 1000 also includes a step of locking linear movement of the outboard end 114 of the linear actuator 106, as shown at block 1008.

In an example, the method 1000 also includes a step of linearly moving the second outboard end 128 of the second linear actuator 126 to position the second vacuum gripper 138, which is located at the second outboard end 128, in contact with the second surface 140 of the workpiece 102, as shown at block 1010. The method 1000 also includes a step of forming a second vacuum between the second vacuum gripper 138 and the second surface 140 of the workpiece 102, as shown at block 1012. The method 1000 also includes a step of further linearly moving the second outboard end 128 of the second linear actuator 126 in response to the second vacuum formed between the second vacuum gripper 138 and the second surface 140 of the workpiece 102, as shown at block 1014. The method 1000 also includes a step of locking linear movement of the second outboard end 128 of the second linear actuator 126, as shown at block 1016.

Figure 21:
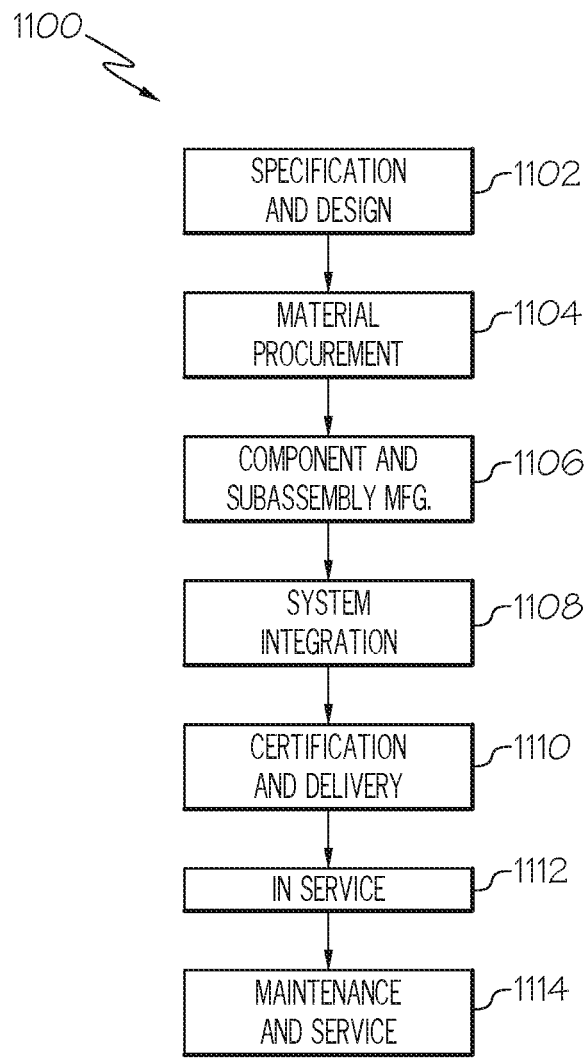
FIG. 21 is a flow diagram of an example aircraft production and service methodology.
Figure 22:
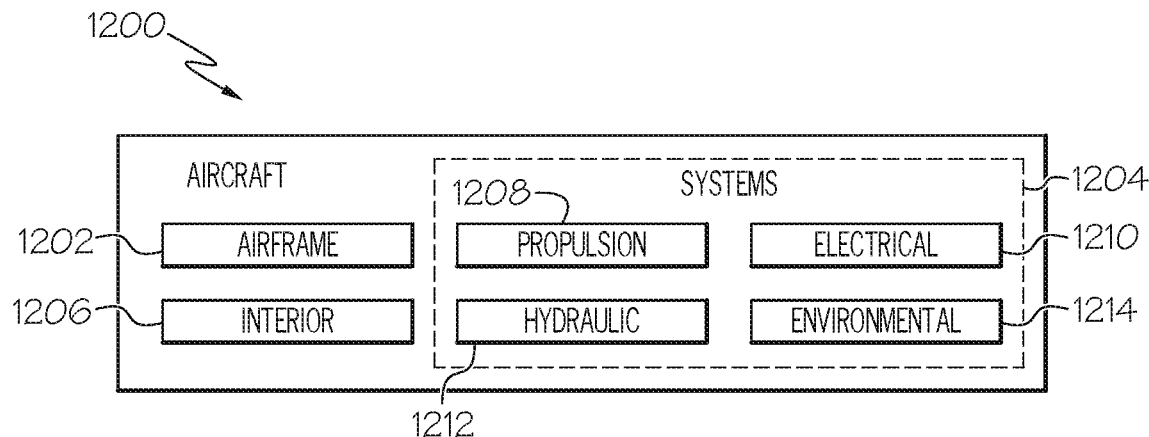
FIG. 22 is a schematic block diagram of another example of the aircraft.

Examples of the apparatus 100 and method 1000 disclosed herein may find use in a variety of potential applications, particularly in the transportation industry, including for example, aerospace applications. Referring now to FIGS. 21 and 22, examples of the apparatus 100 and method 1000 may be used in the context of an aircraft manufacturing and service method 1100, as shown in the flow diagram of FIG. 21, and the aircraft 1200, as shown in FIG. 21. Aircraft applications of the disclosed examples may include use of the apparatus 100 to rigidly hold and support various components (e.g., a spar, a skin panel, etc.) of the aircraft 1200 while undergoing a machining operation.

As shown in FIG. 21, during pre-production, the illustrative method 1100 may include specification and design of aircraft 1200, as shown at block 1102, and material procurement, as shown at block 1104. During production of the aircraft 1200, component and subassembly manufacturing, as shown at block 1106, and system integration, as shown at block 1108, of the aircraft 1200 may take place. Thereafter, the aircraft 1200 may go through certification and delivery, as shown block 1110, to be placed in service, as shown at block 1112. The disclosed apparatus 100 and method 1000 may form a portion of component and subassembly manufacturing (block 1106) and/or system integration (block 1108). Routine maintenance and service may include modification, reconfiguration, refurbishment, etc. of one or more systems of the aircraft 1200.

Each of the processes of illustrative method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 22, the aircraft 1200 produced by the illustrative method may include the airframe 1202, a plurality of high-level systems 1204, and an interior 1206. Other examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

Examples of the apparatus 100 and method 1000 shown or described herein may be employed during any one or more of the stages of the manufacturing and service method 1100 shown in the flow diagram illustrated by FIG. 21. For example, components or subassemblies corresponding to component and subassembly manufacturing (block 1106) may be fabricated or manufactured in a manner similar to components or subassemblies produced while the aircraft 1200 is in service (block 1112). Also, one or more examples of the apparatus 100, method 1000, or combinations thereof may be utilized during production stages (blocks 1108 and 1110). Similarly, one or more examples of the apparatus 100, method 1000, or a combination thereof, may be utilized, for example and without limitation, while the aircraft 1200 is in service (block 1112) and during maintenance and service stage (block 1114).

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

In FIGS. 10 and 22, referred to above, solid lines, if any, connecting various elements and/or components may represent mechanical, electrical, fluid, optical, electromagnetic and other couplings and/or combinations thereof. It will be understood that not all relationships among the various disclosed elements are necessarily represented. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Those skilled in the art will appreciate that some of the features illustrated in FIGS. 10 and 22 may be combined in various ways without the need to include other features described herein, other drawing figures, and/or the accompanying disclosure, even though such combination or combinations are not explicitly illustrated herein. Similarly, additional features not limited to the examples presented, may be combined with some or all of the features shown and described herein.

As used herein, "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

In FIGS. 20 and 21, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 20 and 21 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments and/or examples of the disclosed antenna, aerospace vehicle and method have been shown and described, modifications may occur to those skilled in the art upon reading the specification. The present application includes such modifications and is limited only by the scope of the claims.

What is claimed is:

1. An apparatus for holding a workpiece comprising a web, a first flange coupled to the web, and a second flange coupled to the web opposite the first flange, the apparatus comprising:
   a fixture base comprising a web-gripper configured to grip the web of the workpiece using vacuum;
   a first linear actuator coupled to the fixture base;
   a first flange-gripper coupled to the first linear actuator and configured to grip the first flange of the workpiece using the vacuum, wherein the first linear actuator is configured to linearly move the first flange-gripper along a first movement axis;
   a second linear actuator coupled to the fixture base opposite to the first linear actuator;
   a second flange-gripper coupled to the second linear actuator and configured to grip the second flange of the workpiece using the vacuum, wherein the second linear actuator is configured to linearly move the second flange-gripper along a second movement axis that is parallel to or coincident with the first movement axis;
   a power-transmitting component associated with each one of the first linear actuator and the second linear actuator;
   an actuator stop-lock associated with each one of the first linear actuator and the second linear actuator; and
   a controller configured to selectively activate and deactivate the power-transmitting component and the actuator stop-lock, wherein:
   with the vacuum formed between the web-gripper and the web of the workpiece, the power-transmitting component is configured to extend the first linear actuator and the second linear actuator from an unactuated position to an actuated position and linearly drive the first flange-gripper and the second flange-gripper away from each other in response to a first command from the controller;
   in the unactuated position, the first flange-gripper is not in contact with the first flange of the workpiece and the second flange-gripper is not in contact with the second flange;
   in the actuated position, the first flange-gripper is extended into contact with the first flange of the workpiece and the second flange-gripper is extended into contact with the second flange;
   with the first linear actuator and the second linear actuator in the actuated position, the power-transmitting component is configured to deactivate the first linear actuator and the second linear actuator and enable free extension of the first linear actuator and the second linear actuator in response to a second command from the controller;
   with the first linear actuator and the second linear actuator deactivated, formation of the vacuum between the first flange-gripper and the first flange of the workpiece and between the second flange-gripper and the second flange of the workpiece is operable to extend the first linear actuator and the second linear actuator to a lock position; and
   with the first linear actuator and the second linear actuator in the lock position and the vacuum formed between the vacuum first flange-gripper and the first flange of the workpiece and between the second flange-gripper and the second flange, the actuator stop-lock is configured to activate and lock linear movement of the first linear actuator and the second linear actuator in the lock position in response to a third command from the controller.

2. The apparatus of claim 1, further comprising a sensor in communication with the controller, wherein the sensor is operable to detect when each one of the first linear actuator and the second linear actuator is in the actuated position.

3. The apparatus of claim 1, wherein the first linear actuator and the second linear actuator each comprises a hydraulic linear actuator.

4. The apparatus of claim 1, wherein:
   the web-gripper is positioned on the fixture base between the first linear actuator and the second linear actuator; and
   the first linear actuator and the second linear actuator are perpendicular to each other the web-gripper.

5. The apparatus of claim 1, further comprising
   a third linear actuator coupled to the fixture base perpendicular to the first linear actuator and the second linear actuator, wherein:
   the web-gripper is coupled to the third linear actuator; and
   the third linear actuator is configured to linearly move the web-gripper along a third movement axis that is perpendicular to the first movement axis and the second movement axis.

6. The apparatus of claim 1, wherein:
   the first linear actuator comprises:
      a stationary member coupled to the fixture base; and
      a movable member coupled to the stationary member and linearly movable relative to the stationary member;
   a portion of the moveable member forms an outboard end of the first linear actuator;
   the first flange-gripper is coupled to the outboard end of the first linear actuator;
   the power-transmitting component is coupled to the stationary member and the movable member;
   the power-transmitting component linearly moves the movable member relative to the stationary member when activated; and
   the movable member is freely movable relative to the stationary member when the power-transmitting component is deactivated.

7. The apparatus of claim 6, further comprising
   a power source coupled to the power-transmitting component and the controller, wherein:
   the power source activates the power-transmitting component in response to the first command from the controller; and
   the power source deactivates the power-transmitting component in response to the second command from the controller.

8. The apparatus of claim 6, wherein the actuator stop-lock fixes a linear position of the movable member relative to the stationary member when activated.

9. The apparatus of claim 1, wherein:
the first linear actuator comprises:
a stationary member coupled to the fixture base;
a first movable member coupled to the stationary member and linearly movable relative to the stationary member; and
a second movable member coupled to the first movable member and linearly movable relative to the first movable member;
a portion of the second movable member forms an outboard end of the linear actuator;
the first flange-gripper is coupled to the outboard end of the first linear actuator;
a first portion of the power-transmitting component is coupled to the stationary member and the first movable member;
a second portion of the power-transmitting component is coupled to the first movable member and the second movable member;
the first portion of the power-transmitting component linearly moves the first movable member relative to the stationary member when activated;
the second portion of the power-transmitting component linearly moves the second movable member relative to the first movable member when activated; and
the second movable member is freely movable relative to the first movable member when the second portion of the power-transmitting component is deactivated.

10. The apparatus of claim 9, further comprising a power source coupled to the power-transmitting component and the controller, wherein:
the power source activates the first portion of the power-transmitting component and the second portion of the power-transmitting component in response to the first command from the controller; and
the power source deactivates the second portion of the power-transmitting component in response to the second command from the controller.

11. The apparatus of claim 9, wherein the actuator stop-lock fixes a linear position of the second movable member relative to the first movable member when activated.

12. The apparatus of claim 1, further comprising a first vacuum foot coupled to an outboard end of the first linear actuator, wherein:
the first flange-gripper is coupled to the first vacuum foot;
the first vacuum foot backs up the first flange with the first linear actuator in the lock position; and
the first vacuum foot is pivotable relative to the first linear actuator about a first pivot axis that is perpendicular to the first movement axis.

13. The apparatus of claim 12, further comprising a plurality of first flange-grippers coupled to the first vacuum foot.

14. The apparatus of claim 12, further comprising a second vacuum foot coupled to an outboard end of the second linear actuator, wherein:
the second flange-gripper is coupled to the second vacuum foot;
the second vacuum foot backs up the second flange with the second linear actuator in the lock position; and
the second vacuum foot is pivotable relative to the second linear actuator about a second pivot axis that is perpendicular to the second movement axis.

15. The apparatus of claim 14, further comprising:
a plurality of second flange-grippers coupled to the second vacuum foot.

16. A method for holding a workpiece comprising a web and a flange coupled to the web, the method comprising:
forming a first vacuum connection between a web-gripper, coupled to a fixture base, and the web of the workpiece;
with the first vacuum connection formed between the web-gripper and the web of the workpiece, extending a linear actuator, coupled to the fixture base, from an unactuated position, in which a flange-gripper coupled to the linear actuator, is not in contact with the flange of the workpiece, to an actuated position, in which the flange-gripper is in contact with the flange of the workpiece, by activating a power-transmitting component of the linear actuator;
with the linear actuator in the actuated position, enabling free linear extension of the linear actuator by deactivating the power-transmitting component;
with the power-transmitting component deactivated, forming a second vacuum connection between the flange-gripper and the flange of the workpiece;
with the power-transmitting component deactivated freely extending the linear actuator from the actuated position to a lock position in response to forming the second vacuum connection between the flange-gripper and the flange of the workpiece; and
with the second vacuum connection formed between the flange-gripper and the flange of the workpiece, locking linear movement of the linear actuator in the lock position by activating an actuator stop-lock.

17. The method of claim 16, further comprising detecting when the linear actuator is in the actuated position.

18. The method of claim 16, wherein the workpiece further comprises a second flange coupled to the web opposite the first flange, the method further comprising:
with the first vacuum connection formed between the web-gripper and the web of the workpiece, extending a second linear actuator, coupled to the fixture base opposite the linear actuator, from a second unactuated position, in which a second flange-gripper coupled to the second linear actuator, is not in contact with the second flange of the workpiece, to a second actuated position, in which the second flange-gripper is in contact with the second flange of the workpiece, by activating a second power-transmitting component of the second linear actuator;
with the second linear actuator in the second actuated position, enabling free linear extension of the second linear actuator by deactivating the second power-transmitting component;
with the second power-transmitting component deactivated, forming third vacuum connection between the second flange-gripper and the second flange of the workpiece;
with the second power-transmitting component deactivated freely extending the second linear actuator from the actuated position to a second lock position in response to forming the third vacuum between the second flange-gripper and the second flange of the workpiece; and
with the third vacuum connection formed between the second flange-gripper and the second flange of the workpiece, locking linear movement of the second linear actuator in the second lock position by activating a second actuator stop-lock.

19. The method of claim 18, wherein forming the second vacuum connection between the flange-gripper and the flange and forming the third vacuum connection between the second flange-gripper and the second flange occur concurrently.

20. The method of claim 18, wherein extending the linear actuator to the actuated position and extending the second linear actuator to the second actuated position move the flange-gripper and the second flange-gripper away from each other.

* * * * *